US011163223B2

(12) United States Patent
Sugiyama

(10) Patent No.: US 11,163,223 B2
(45) Date of Patent: Nov. 2, 2021

(54) PROJECTOR WITH COOLER

(71) Applicant: SEIKO EPSON CORPORATION, Tokyo (JP)

(72) Inventor: Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/818,038

(22) Filed: Mar. 13, 2020

(65) Prior Publication Data
US 2020/0292927 A1 Sep. 17, 2020

(30) Foreign Application Priority Data
Mar. 15, 2019 (JP) .............................. JP2019-048653

(51) Int. Cl.
| | |
|---|---|
| G03B 21/16 | (2006.01) |
| F28D 15/02 | (2006.01) |
| F24F 3/14 | (2006.01) |
| H04N 9/31 | (2006.01) |
| F28D 21/00 | (2006.01) |

(52) U.S. Cl.
CPC ............... *G03B 21/16* (2013.01); *F24F 3/14* (2013.01); *F28D 15/0283* (2013.01); *F28D 21/0015* (2013.01); *H04N 9/3144* (2013.01); *F28D 2021/0028* (2013.01)

(58) Field of Classification Search
CPC .... F24F 3/14; F28D 15/0266; F28D 15/0275; F28D 15/0283; F28D 2021/0028; F28D 21/0015; G03B 21/16; H04N 9/3144
See application file for complete search history.

(56) References Cited

U.S. PATENT DOCUMENTS

| | | | |
|---|---|---|---|
| 7,652,885 B2 | 1/2010 | Tomioka | |
| 8,517,540 B2* | 8/2013 | Terao | H04N 9/3144 353/58 |
| 2002/0191159 A1 | 12/2002 | Nagao et al. | |
| 2008/0236191 A1* | 10/2008 | Tsuchiya | F25D 21/14 62/498 |
| 2009/0244846 A1 | 10/2009 | Tomioka | |
| 2010/0132379 A1 | 6/2010 | Wu et al. | |
| 2011/0037954 A1* | 2/2011 | Tsuchiya | G03B 21/16 353/54 |

(Continued)

FOREIGN PATENT DOCUMENTS

| | | |
|---|---|---|
| JP | 2001-168564 A | 6/2001 |
| JP | 2002-107698 A | 4/2002 |

(Continued)

*Primary Examiner* — Bao-Luan Q Le
(74) *Attorney, Agent, or Firm* — Oliff PLC

(57) ABSTRACT

A projector includes a light source, a light modulator, a projection optical apparatus, a cooler configured to cool a cooling target based on transformation of a refrigerant into a gas, and a dustproof enclosure accommodating the cooling target. The cooler includes a refrigerant generator configured to generate the refrigerant and a refrigerant sender configured to send the generated refrigerant toward the cooling target. Part of a wall part that forms the dustproof enclosure is a refrigerant transmissive section that maintains dust resistance of the dustproof enclosure and allows transmission of the refrigerant into the interior of the dustproof enclosure from the exterior thereof.

14 Claims, 13 Drawing Sheets

(56) References Cited

U.S. PATENT DOCUMENTS

| | | | |
|---|---|---|---|
| 2011/0242499 A1* | 10/2011 | Terao | ........... H04N 9/3144 353/57 |
| 2019/0196311 A1 | 6/2019 | Sugiyama et al. | |

FOREIGN PATENT DOCUMENTS

| | | | |
|---|---|---|---|
| JP | 2002-372748 | A | 12/2002 |
| JP | 2007-294655 | A | 11/2007 |
| JP | 2009-236407 | A | 10/2009 |
| JP | 2010-107751 | A | 5/2010 |
| JP | 2011-036768 | A | 2/2011 |
| JP | 2011-215457 | A | 10/2011 |
| JP | 2014-087797 | A | 5/2014 |
| JP | 2016-057902 | A | 4/2016 |
| JP | 2016-071694 | A | 5/2016 |
| JP | 2018-110200 | A | 7/2018 |
| JP | 2019-117332 | A | 7/2019 |

* cited by examiner

PROJECTOR WITH COOLER

The present application is based on, and claims priority from JP Application Serial Number 2019-048653, filed Mar. 15, 2019, the disclosure of which is hereby incorporated by reference herein in its entirety.

BACKGROUND

1. Technical Field

The present disclosure relates to a projector.

2. Related Art

As a unit that cools a projector, there have been proposed cooling units, for example, an air-based cooling unit shown in JP-A-2002-107698 using a blower and a liquid-based cooling unit shown in JP-A-2007-294655 using a pump that delivers a refrigerant liquid and a pipe through which the refrigerant liquid passes.

In recent years, an increase in luminance of light outputted from a projector and other factors increase the amount of heat produced by a cooling target to be cooled by a cooling unit, and the cooling performance of the cooling unit is required to be improved. To improve the cooling performance of the cooling unit described above based, for example, on air or liquid, however, the cooling unit is enlarged, resulting in a problem of an increase in the size of the projector. Further, in the case of the air-based cooling, there is also a problem of an increase in noise produced by the blower.

SUMMARY

An aspect of a projector according to the present disclosure is a projector including a cooling target, the projector including a light source configured to emit light, a light modulator configured to modulate the light emitted from the light source in accordance with an image signal, a projection optical apparatus configured to project the light modulated by the light modulator, a cooler configured to cool the cooling target based on transformation of a refrigerant into a gas, and a dustproof enclosure accommodating the cooling target. The cooler includes a refrigerant generator configured to generate the refrigerant and a refrigerant sender configured to send the generated refrigerant toward the cooling target. Part of a wall part that forms the dustproof enclosure is a refrigerant transmissive section that maintains dust resistance of the dustproof enclosure and allows transmission of the refrigerant into an interior of the dustproof enclosure from an exterior thereof.

The refrigerant transmissive section may be formed of a porous member.

The refrigerant generator may include a rotating moisture absorbing/discharging member, a first blower configured to deliver air to a portion of the moisture absorbing/discharging member that is a portion located in a first region, a heat exchanger connected to the refrigerant sender, a heater configured to heat a portion of the moisture absorbing/discharging member that is a portion located in a second region different from the first region, and a second blower configured to deliver, to the heat exchanger, air around a portion of the moisture absorbing/discharging member that is the portion heated by the heater. The heat exchanger, when cooled, may generate the refrigerant from the air flowing into the heat exchanger.

The portion of the moisture absorbing/discharging member that is the portion located in the first region may face the refrigerant transmissive section with a distance between the portion and the refrigerant transmissive section in a region outside the dustproof enclosure.

The first blower may deliver air that passed through the portion of the moisture absorbing/discharging member that is the portion located in the first region to an outer surface of the refrigerant transmissive section.

The first blower may deliver air that came into contact with an outer surface of the refrigerant transmissive section to the portion of the moisture absorbing/discharging member that is the portion located in the first region.

The projector may further include an outer blower configured to deliver air to an outer surface of the refrigerant transmissive section.

The projector may further include a controller configured to adjust an amount of air delivered to the outer surface of the refrigerant transmissive section based on humidity in the dustproof enclosure.

The refrigerant generator may include a rotating moisture absorbing/discharging member having a portion that is located in a first region and faces the refrigerant transmissive section with a distance between the portion and the refrigerant transmissive section in a region outside the dustproof enclosure, a heat exchanger connected to the refrigerant sender, a heater configured to heat a portion of the moisture absorbing/discharging member that is a portion located in a second region different from the first region, and a blower configured to deliver, to the heat exchanger, air around a portion of the moisture absorbing/discharging member that is the portion heated by the heater, and the heat exchanger, when cooled, may generate the refrigerant from the air flowing into the heat exchanger.

The projector may further include a cooling blower disposed in the dustproof enclosure and configured to deliver air to the cooling target.

The cooling blower may circulate air in the dustproof enclosure to deliver the air to an inner surface of the refrigerant transmissive section.

The projector may further include a shutter configured to switch between a state in which the shutter exposes an outer surface of the refrigerant transmissive section and a state in which the shutter covers and closes the entire outer surface of the refrigerant transmissive section.

The projector may further include a moisture absorbing member accommodated in the dustproof enclosure.

The cooling target may be the light modulator.

DESCRIPTION OF EXEMPLARY EMBODIMENTS

Projectors according to embodiments of the present disclosure will be described below with reference to the drawings. The scope of the present disclosure is not limited to the following embodiments and can be arbitrarily changed within the scope of the technical idea of the present disclosure. In the following drawings, for clarity of each configuration, the scale, the number, and other factors of the structure of the configuration differ from the scale, the number, and the other factors of an actual structure of the configuration in some cases.

First Embodiment

Figure 1:
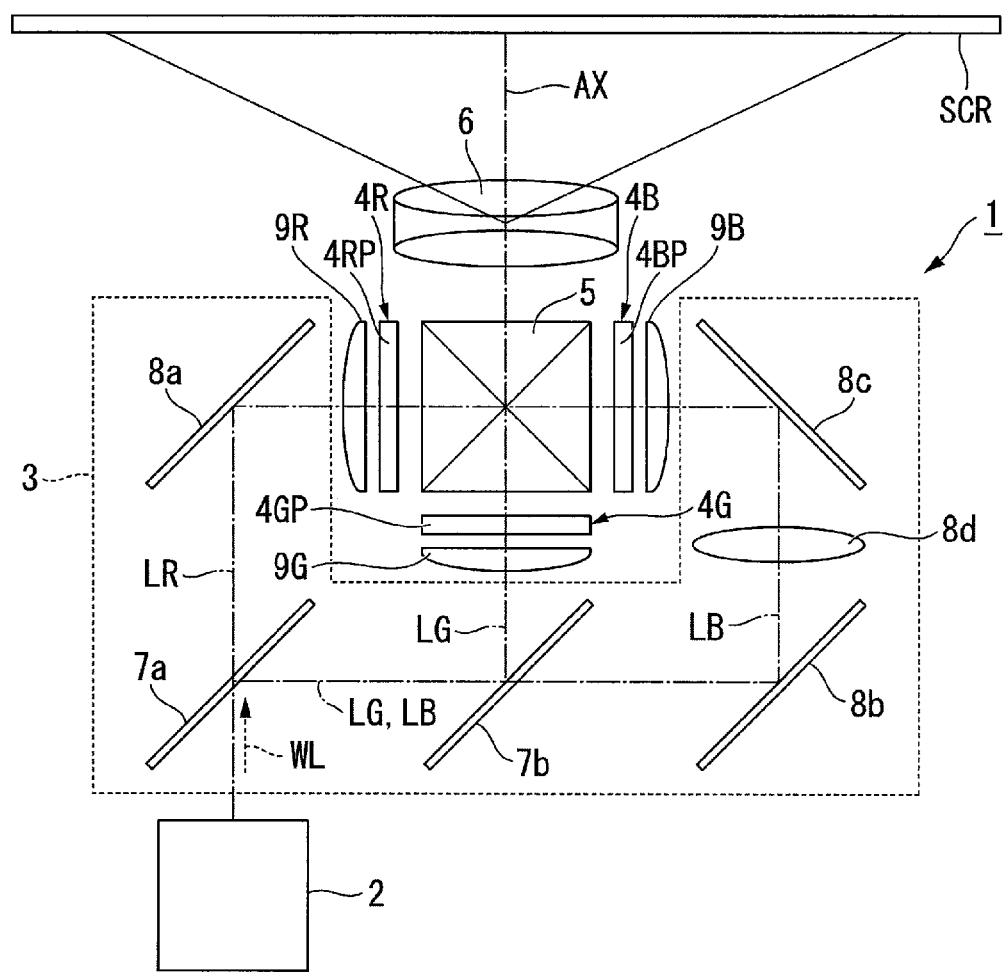
FIG. 1 is a schematic configuration diagram showing a projector according to a first embodiment.
Figure 2:
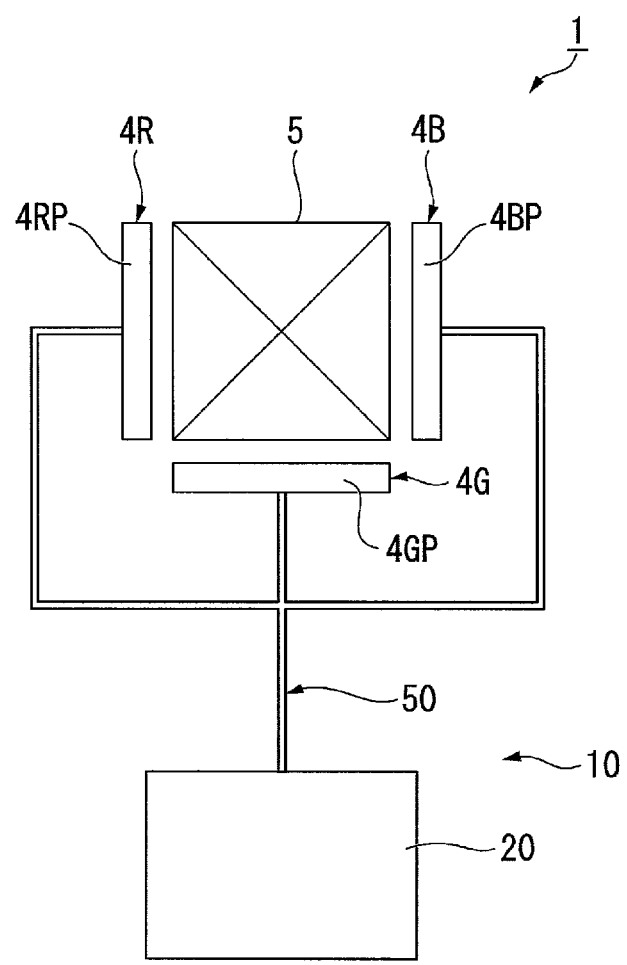
FIG. 2 is a diagrammatic view showing part of the projector according to the first embodiment.

FIG. 1 is a schematic configuration diagram showing a projector 1 according to the present embodiment. FIG. 2 is a diagrammatic view showing part of the projector 1 according to the present embodiment. The projector 1 includes a light source apparatus 2, a color separation system 3, a light modulation unit 4R, a light modulation unit 4G, a light modulation unit 4B, a light combining system 5, and a projection optical apparatus 6, as shown in FIG. 1. The light modulation unit 4R includes a light modulator 4RP. The light modulation unit 4G includes a light modulator 4GP. The light modulation unit 4B includes a light modulator 4BP.

The light source apparatus 2 outputs illumination light WL, which is so adjusted to have a substantially uniform illuminance distribution, toward the color separation system 3. The light source apparatus 2 includes, for example, a semiconductor laser as a light source. The color separation system 3 separates the illumination light WL from the light source apparatus 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source apparatus 2 into the red light LR and light containing the green light LG and the blue light LB mixed with each other. The first dichroic mirror 7a is so characterized as to transmit the red light LR and reflect the green light LG and the blue light LB. The second dichroic mirror 7b separates the light containing the green light LG and the blue light LB mixed with each other into the green light LG and the blue light LB. The second dichroic mirror 7b is so characterized as to reflect the green light LG and transmit the blue light LB.

The first reflection mirror 8a is disposed in the optical path of the red light LR and reflects the red light LR having passed through the first dichroic mirror 7a toward the light modulator 4RP. The second reflection mirror 8b and the third reflection mirror 8c are disposed in the optical path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light outputted from the light source apparatus 2 in accordance with an image signal. The light modulator 4GP modulates the green light LG out of the light outputted from the light source apparatus 2 in accordance with an image signal. The light modulator 4BP modulates the blue light LB out of the light outputted from the light source apparatus 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a substantially cubic shape. The light combining system 5 combines the color image light fluxes from the light modulators 4RP, 4GP, and 4BP with one another. The light combining system 5 outputs the combined image light toward the projection optical apparatus 6. The projection optical apparatus 6 is formed of a projection lens group. The projection optical apparatus 6 enlarges the combined image light from the light combining system 5, that is, the light fluxes modulated by the light modulators 4RP, 4GP, and 4BP and projects the enlarged image light or modulated light fluxes toward a screen SCR. An enlarged color image (video) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B. That is, in the present embodiment, the cooling target includes the light modulators 4RP, 4GP, and 4BP.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target, that is, the light modulation units 4R, 4G, and 4B in the present embodiment vaporizes so as to be capable of drawing heat from the cooling target, whereby the cooler 10 can cool the cooling target. The refrigerant generator 20 and the refrigerant sender 50 will be described below in detail.

Figure 3:
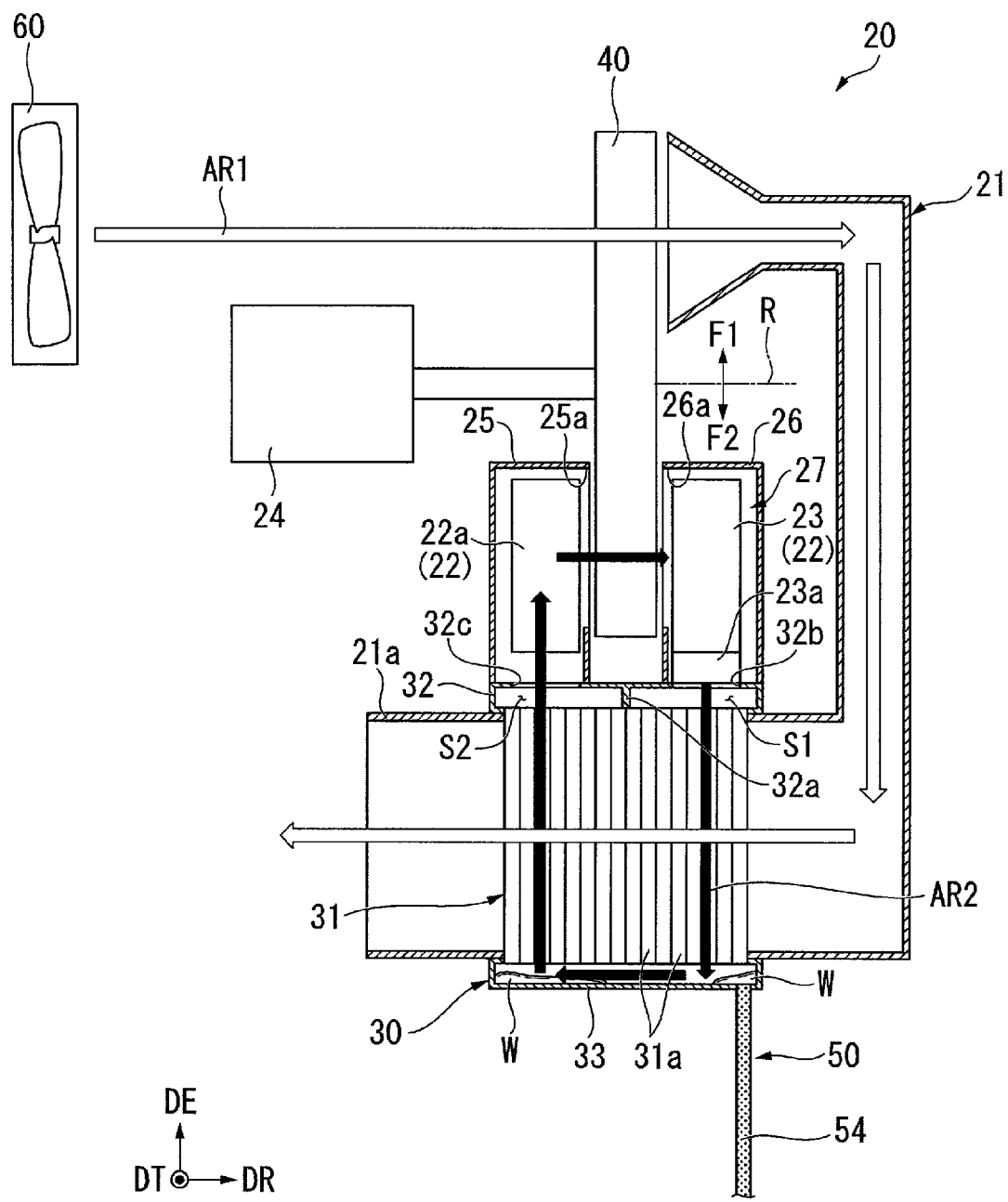
FIG. 3 is a schematic configuration diagram diagrammatically showing a refrigerant generator in the first embodiment.

FIG. 3 is a schematic configuration diagram diagrammatically showing the refrigerant generator 20 in the present embodiment. The refrigerant generator 20 includes a moisture absorbing/discharging member 40, a motor 24, a first blower 60, a heat exchanger 30, a first circulation duct 25, a second circulation duct 26, a heater 22, a second blower 23, and a cooling duct 21, as shown in FIG. 3.

Figure 4:
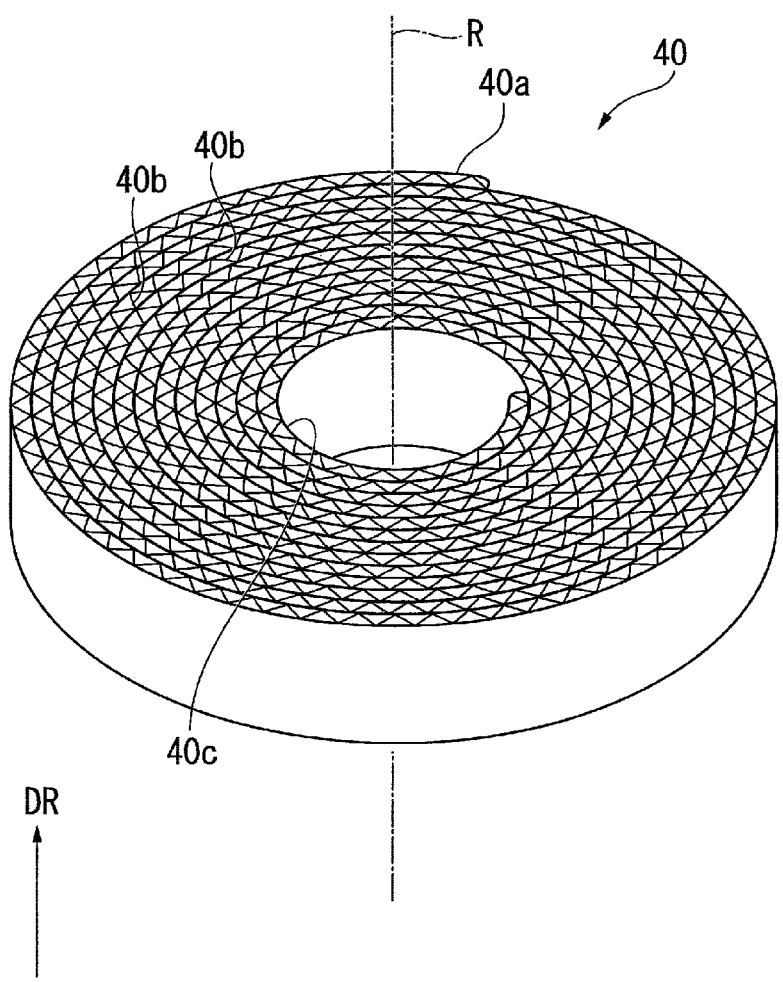
FIG. 4 is a perspective view of a moisture absorbing/discharging member in the first embodiment.

FIG. 4 is a perspective view showing the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR in the drawings.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. A surface of the wound band-shaped member 40a that is the surface exposed to the ambient environment includes the outer surface of the moisture absorbing/discharging member 40, the inner circumferential surface of the central hole 40c, and the inner surface of each of the through holes 40b. The moisture absorbing/discharging member 40 may instead be entirely made of a substance that absorbs and discharges moisture. An example of the substance that absorbs and discharges moisture may include zeolite and silica gel.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 0.2 rpm but smaller than or equal to 5 rpm.

The first blower 60 is, for example, an intake fan that takes outside air into the projector 1. The first blower 60 delivers air AR1 to a portion of the moisture absorbing/discharging member 40 that is the portion located in a first region F1. In the present embodiment, the first region F1 is a region on one side of the axis of rotation R in the direction perpendicular to the axis of rotation R. On the other hand, the region on the other side of the axis of rotation R in the direction perpendicular to the axis of rotation R, that is, the region opposite the first region F1 with respect to the axis of rotation R is a second region F2. The first region F1 is a region above the axis of rotation R in FIG. 3. The second region F2 is a region below the axis of rotation R in FIG. 3. The first blower 60 is not limited to a specific apparatus and may be any apparatus capable of delivering the air AR1, for example, an axial fan and a centrifugal fan.

Figure 5:
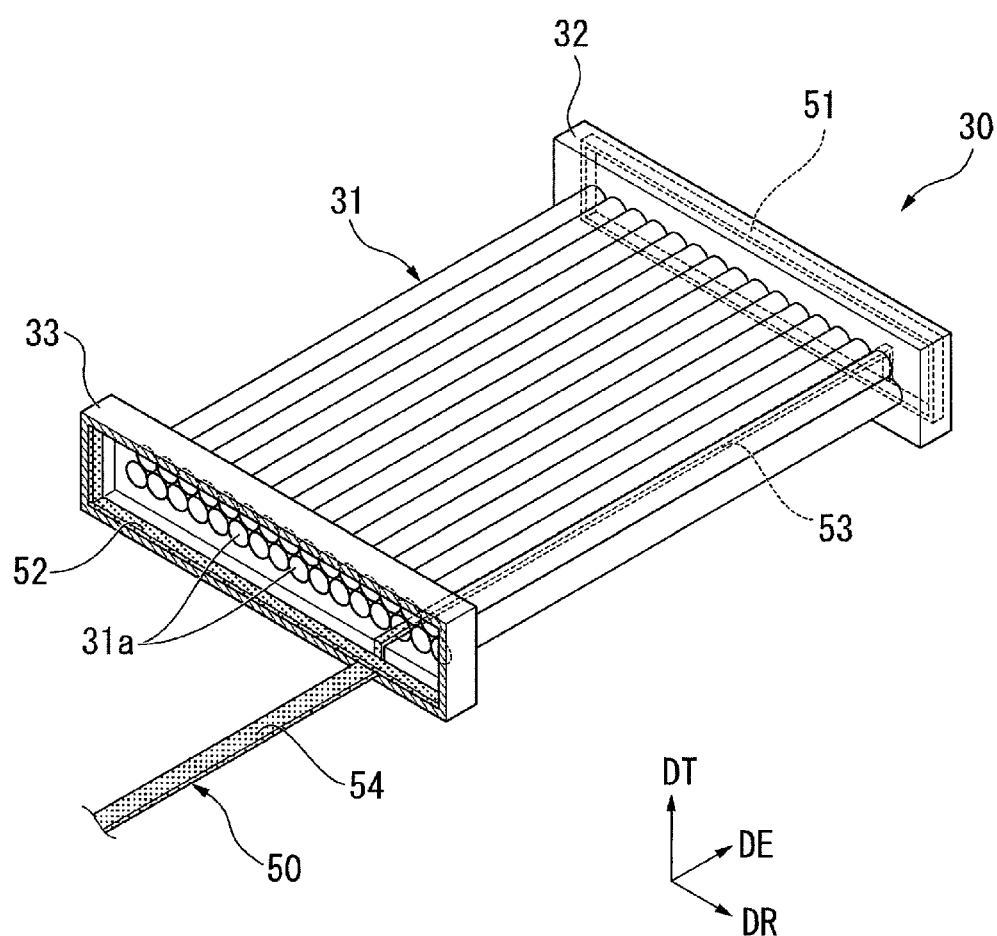
FIG. 5 is a partial cross-sectional perspective view showing a heat exchanger in the first embodiment.

The heat exchanger 30 is a portion that generates the refrigerant W. FIG. 5 is a partial cross-sectional perspective view showing the heat exchanger 30. The heat exchanger 30 includes a flow passage section 31, a first lid 32, and a second lid 33, as shown in FIG. 5.

The flow passage section 31 includes a plurality of tubular pipes 31a extending in one direction. In the present embodiment, the one direction in which the pipes 31a extend is, for example, perpendicular to the rotational axis direction DR. The pipes 31a each open at the opposite ends thereof in the one direction in which the pipe 31a extends. The pipes 31a each have, for example, a circular cross-sectional shape perpendicular to the one direction in which the pipe 31a extends. In the following description, the one direction in which the pipes 31a extend is called an "extension direction DE" and drawn as appropriate in the form of an axis DE in the drawings. The first region F1 and the second region F2 described above are separate with respect to the axis of rotation R from each other in the extension direction DE perpendicular to the rotational axis direction DR.

In the present embodiment, the flow passage section 31 is formed by layering a plurality of layers, which are each formed of a plurality of pipes 31a arranged in the rotational axis direction DR, on each other in the direction perpendicular both to the rotational axis direction DR and the extension direction DE. In the following description, the direction perpendicular both to the rotational axis direction DR and the extension direction DE is called a "thickness direction DT" and drawn as appropriate in the form of an axis DT in the drawings. In the present embodiment, the dimension of the flow passage section 31 in the thickness direction DT is, for example, smaller than the dimension of the flow passage section 31 in the rotational axis direction DR or is the smallest of the dimensions of the flow passage section 31 in the directions perpendicular to the extension direction DE.

The first lid 32 is connected to an end of the flow passage section 31 that is the end on one side in the extension direction DE (+DE side). The first lid 32 has the shape of a rectangular parallelepiped box elongated in the rotational axis direction DR. One end of each of the pipes 31a in the extension direction DE opens in the first lid 32. A partition 32a is provided in the first lid 32, as shown in FIG. 3. The partition 32a partitions the interior of the first lid 32 into a first space S1 and a second space S2 disposed side by side in the rotational axis direction DR. In FIG. 3, the first space S1 is located on one side of the second space S2 in the rotational axis direction DR (+DR side).

A communication hole 32b, which allows the first space S1 to be continuous with the interior of the second circulation duct 26, is formed in the first lid 32. A communication hole 32c, which allows the second space S2 to be continuous with the interior of the first circulation duct 25, is formed in the first lid 32.

The second lid 33 is connected to an end of the flow passage section 31 that is the end on the other side in the extension direction DE (−DE side), that is, the end opposite the end to which the first lid 32 is connected to the flow passage section 31. The second lid 33 has the shape of a rectangular parallelepiped box elongated in the rotational axis direction DR, as shown in FIG. 5. The other end of each of the pipes 31a in the extension direction DE opens in the second lid 33. The interior of the second lid 33 is not partitioned, unlike in the first lid 32. The interior of the second lid 33 is continuous with the first space S1 and the second space S2 in the first lid 32 via the interior of the pipes 31a of the flow passage section 31. The second lid 33 is connected to the refrigerant sender 50. The heat exchanger 30 is thus connected to the refrigerant sender 50. In FIG. 5, a wall of the second lid 33 that is the wall located on the other side in the extension direction DE is omitted.

The first circulation duct 25 is a duct extending from the heat exchanger 30 to the other side of the moisture absorbing/discharging member 40 in the rotational axis direction DR (−DR side), as shown in FIG. 3. One end of the first circulation duct 25 is connected to the heat exchanger 30. The first circulation duct 25 has an inlet continuous with the communication hole 32*c* in the first lid 32. The interior of the first circulation duct 25 is continuous with the second space S2 via the inlet and the communication hole 32*c*. The other end of the first circulation duct 25 is so disposed as to face the moisture absorbing/discharging member 40 via a small gap. The air sent by the second blower 23 from the interior of the heat exchanger 30 to the moisture absorbing/discharging member 40 passes through the first circulation duct 25.

The first circulation duct 25 has a first opening 25*a*, which faces a portion of the moisture absorbing/discharging member 40 that is the portion located in the second region F2. The first opening 25*a* is located on the other side of the moisture absorbing/discharging member 40 in the rotational axis direction DR (−DR side) and opens to one side of the moisture absorbing/discharging member 40 in the rotational axis direction DR (+DR side) toward the moisture absorbing/discharging member 40.

The second circulation duct 26 is a duct extending from the one side of the moisture absorbing/discharging member 40 in the rotational axis direction DR (+DR side) to the heat exchanger 30. One end of the second circulation duct 26 is so disposed as to face the moisture absorbing/discharging member 40 via a small gap. The other end of the second circulation duct 26 is connected to the heat exchanger 30. The second circulation duct 26 has an outlet continuous with the communication hole 32*b* in the first lid 32. The interior of the second circulation duct 26 is continuous with the first space S1 via the outlet and the communication hole 32*b*. The air sent by the second blower 23 from the moisture absorbing/discharging member 40 to the interior of the heat exchanger 30 passes through the second circulation duct 26.

The second circulation duct 26 has a second opening 26*a*, which faces a portion of the moisture absorbing/discharging member 40 that is the portion located in the second region F2. The second opening 26*a* is located on the one side of the moisture absorbing/discharging member 40 in the rotational axis direction DR (+DR side) and opens to the other side of the moisture absorbing/discharging member 40 in the rotational axis direction DR (−DR side) toward the moisture absorbing/discharging member 40. The second opening 26*a* is disposed in a position where the moisture absorbing/discharging member 40 is sandwiched between the first opening 25*a* and the second opening 26*a* in the rotational axis direction DR.

Although not shown in FIG. 3, the first opening 25*a* and the second opening 26*a* in the present embodiment each have a fan-like shape around the axis of rotation R of the moisture absorbing/discharging member 40 when viewed along the rotational axis direction DR. The "fan-like shape" in the present specification includes the shape surrounded by two arcs around the same center of curvature but having different radii and two line segments that extend in the radial direction of a circle around the center of curvature and connect the opposite ends of the two arcs to each other. In the present embodiment, the first opening 25*a* and the second opening 26*a* each have the fan-like shape surrounded by the two arcs and the two line segments described above.

The centers of curvature of the arcs of the fan-like shapes of the first opening 25*a* and the second opening 26*a* coincide with the axis of rotation R of the moisture absorbing/discharging member 40 when viewed along the rotational axis direction DR.

The heater 22 includes a heating main body 22*a*. The heating main body 22*a* is disposed in the first circulation duct 25. The heating main body 22*a* is disposed on the other side, in the rotational axis direction DR (−DR side), of a portion of the moisture absorbing/discharging member 40 that is the portion located in the second region F2. The heating main body 22*a* is, for example, an electric heater. The heating main body 22*a* heats the atmosphere in the first circulation duct 25. In the present embodiment, the heater 22 includes the second blower 23.

The second blower 23 is disposed in the second circulation duct 26. The second blower 23 is disposed on the one side, in the rotational axis direction DR (+DR side), of a portion of the moisture absorbing/discharging member 40 that is the portion located in the second region F2. The second blower 23 is, for example, a centrifugal fan. The second blower 23 exhausts air sucked from the other side in the rotational axis direction DR (−DR side) via an exhaust port 23*a* toward the other side in the extension direction DE (−DE side). The exhaust port 23*a* opens toward the communication hole 32*b* in the first lid 32. The second blower 23 delivers the air into the first space S1 via the communication hole 32*b*.

The air discharged from the second blower 23 into the first space S1 is the air having been sucked from the other side of the second blower 23 in the rotational axis direction DR (−DR side) via the second opening 26*a* of the second circulation duct 26 and having passed through a portion of the moisture absorbing/discharging member 40 that is the portion located in the second region F2. That is, the second blower 23 causes the air to pass through a portion of the moisture absorbing/discharging member 40 that is the portion located in the second region F2, which differs from the first region F1, and delivers the air to the heat exchanger 30. In the present embodiment, the air before passing through a portion of the moisture absorbing/discharging member 40 that is the portion located in the second region F2 has flowed in the first circulation duct 25. The heating main body 22*a* therefore heats the air before passing through a portion of the moisture absorbing/discharging member 40 that is the portion located in the second region F2.

As described above, in the present embodiment, the heater 22 heats a portion of the moisture absorbing/discharging member 40 that is the portion located in the second region F2 with the aid of the second blower 23, which delivers the air heated by the heating main body 22*a* to a portion of the moisture absorbing/discharging member 40 that is the portion located in the second region F2. The second blower 23 thus delivers air around a portion of the moisture absorbing/discharging member 40 that is the portion heated by the heater 22 to the heat exchanger 30.

The air having flowed from the second blower 23 into the heat exchanger 30 via the first space S1 passes through the pipes 31*a* continuous with the first space S1 out of the plurality of pipes 31*a* and flows into the second lid 33, as shown in FIG. 3. The air having flowed into the second lid 33 passes through the pipes 31*a* continuous with the second space S2 out of the plurality of pipes 31*a*, flows into the second space S2, and flows into the first circulation duct 25 via the communication hole 32*c*. The air having flowed into the first circulation duct 25 is heated by the heating main body 22*a*, passes through a portion of the moisture absorbing/discharging member 40 that is the portion located in the second region F2 again, flows into the second circulation duct 26, and is sucked by the second blower 23.

As described above, the refrigerant generator 20 has a circulation path 27, which passes through a portion of the moisture absorbing/discharging member 40 that is the portion located in the second region F2 and the heat exchanger 30. The circulation path 27 is an air circulation path through which the are is delivered from the heat exchanger 30, passes through the first circulation duct 25, a portion of the moisture absorbing/discharging member 40 that is the portion located in the second region F2, and the second circulation duct 26 in the presented order, and returns to the heat exchanger 30 again. The second blower 23 circulates the air through the circulation path 27. The air circulating through the circulation path 27 passes through the heating main body 22a in the first circulation duct 25. The circulation path 27 is substantially sealed although small gaps are provided between the moisture absorbing/discharging member 40 and the first and second circulation ducts 25, 26, and entry of air outside the circulation path 27 into the circulation path 27 is therefore suppressed. In the following description, the air circulating through the circulation path 27 is called air AR2.

The cooling duct 21 is a duct having an inlet disposed on the one side (+DR side), in the rotational axis direction DR, of a portion of the moisture absorbing/discharging member 40 that is the portion located in the first region F1. Air flowing into the cooling duct 21 is the air AR1 having been discharged from the first blower 60 and having passed through a portion of the moisture absorbing/discharging member 40 that is the portion located in the first region F1. The cooling duct 21 extends from a region on the one side of a portion of the moisture absorbing/discharging member 40 that is the portion located in the first region F1 toward the heat exchanger 30.

The cooling duct 21 includes a cooling passage 21a, which extends in the rotational axis direction DR. The flow passage section 31 of the heat exchanger 30 is so disposed in the cooling passage 21a as to pass thereacross in the extension direction DE. The flow passage section 31 is thus disposed in the cooling passage 21a. The air AR1 passing through the cooling passage 21a is sprayed onto the outer surface of the flow passage section 31 and passes by the flow passage section 31 in the rotational axis direction DR. The flow passage section 31 is thus cooled by the air AR1. That is, the heat exchanger 30 is cooled by the air AR1 having been discharged from the first blower 60 and having passed through the moisture absorbing/discharging member 40. In FIG. 3, the air AR1 in the cooling passage 21a passes by the flow passage section 31 from right to left. The cooling passage 21a has an open end facing the other side in the rotational axis direction DR (-DR side). The opening of the cooling passage 21a is, for example, of an outlet of the cooling duct 21.

When the air AR1 is delivered from the first blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 rotates the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 thus vaporizes and is discharged into the air AR2.

The air AR2 having passed through the moisture absorbing/discharging member 40 and therefore containing the water vapor absorbed from the air AR1 is delivered by the second blower 23 to the heat exchanger 30. The air AR2 having flowed via the first space S1 into the heat exchanger 30 flows through the flow passage section 31. In more detail, the air AR2 flows through part of the pipes 31a of the flow passage section 31. The flow passage section 31 is externally cooled by the air AR1 flowing along the rotational axis direction DR through the cooling passage 21a of the cooling duct 21.

When the flow passage section 31 is cooled, the air AR2 flowing through part of the pipes 31a and having a relatively high temperature is cooled, so that the water vapor contained in the air AR2 condenses into liquid water, that is, the refrigerant W. The heat exchanger 30, when cooled, thus generates the refrigerant W from the air AR2 having flowed into the heat exchanger 30. In the present specification, the refrigerant W after generated in the refrigerant generator 20 is called in some cases a refrigerant W having vaporized or simply the refrigerant W even when the refrigerant W vaporizes into a gas (water vapor).

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, a third catcher 53, and a connector 54, as shown in FIG. 5.

The first catcher 51 is fixed to an edge portion of an inner surface of the first lid 32 that is the inner surface facing the one side in the extension direction DE (+DE side). The first catcher 51 has a thin-band-like shape and is formed in a rectangular-frame-like shape extending along the edge portion of the first lid 32. The second catcher 52 is fixed to an edge portion of an inner surface of the second lid 33 that is the inner surface facing the other side in the extension direction DE (-DE side). The second catcher 52 has a thin-band-like shape and is formed in a rectangular-frame-like shape extending along the edge portion of the second lid 33.

The third catcher 53 extends from the first catcher 51, passes through a pipe 31a, and reaches the second catcher 52, so that the third catcher 53 connects the first catcher 51 to the second catcher 52. The third catcher 53 has a thin-band-like shape extending in the extension direction DE. In the present embodiment, the third catcher 53 is disposed in one of the plurality of pipes 31, as shown in FIG. 5, but not necessarily. The third catcher 53 may be provided in each of part of the plurality of pipes 31a or may be provided in each of the plurality of pipes 31a. When the third catcher 53 is provided in each of part of the plurality of pipes 31, the third catchers 53 may be provided in two or more pipes 31a.

Figure 6:
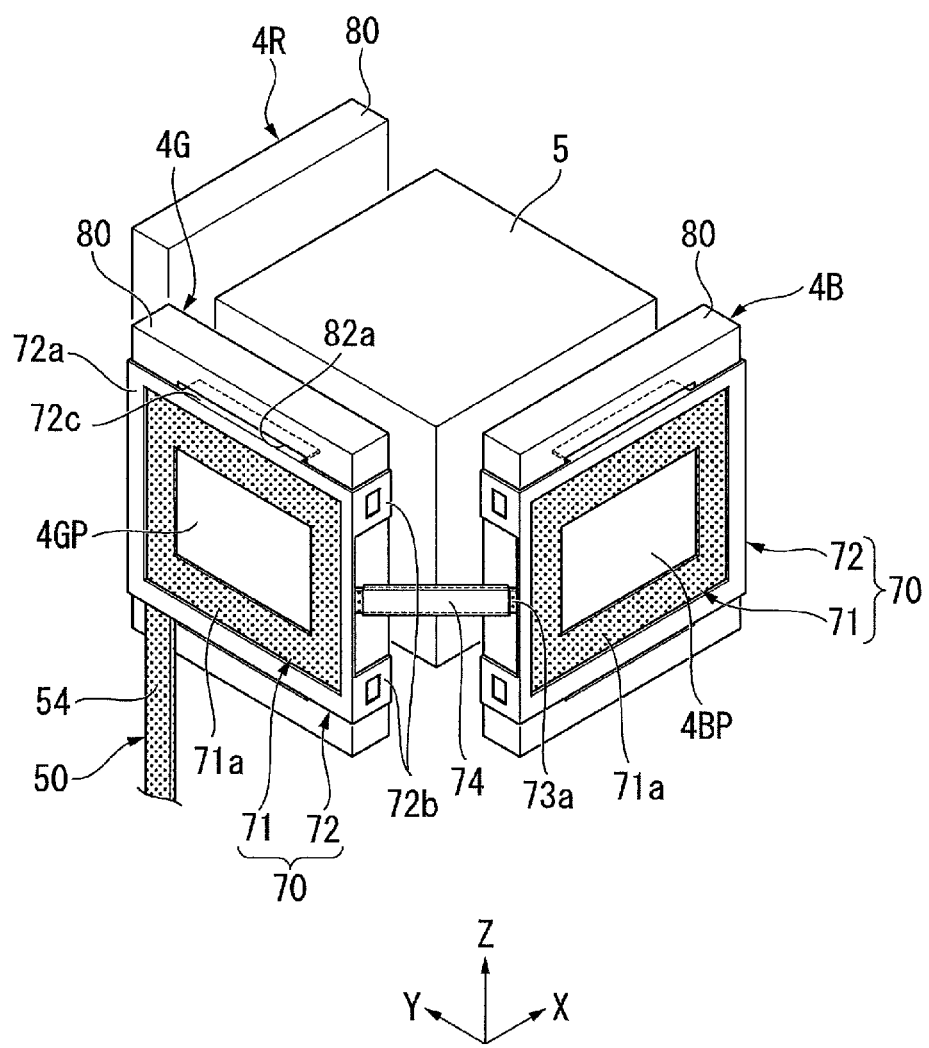
FIG. 6 is a perspective view showing light modulation units and a light combining system in the first embodiment.

The connector 54 is a portion that connects the refrigerant generator 20 to the cooling target. In the present embodiment, the connector 54 is connected to the second catcher 52, extends from the interior of the second lid 33, passes through the wall of the second lid 32, and protrudes out of the second lid 33. The connector 54, which protrudes out of the second lid 33, extends to the light modulation unit 4G, which is part of the cooling target, as shown in FIG. 6. FIG. 6 is a perspective view showing the light modulation units 4R, 4G, and 4B and the light combining system 5. The connector 54 has a thin-band-like shape. The width of the connector 54 is, for example, greater than the width of the first catcher 51, the width of the second catcher 52, and the width of the third catcher 53, as shown in FIG. 5.

The light modulation units 4R, 4G, and 4B, which are each the cooling target in the present embodiment, will next be described in more detail. In the following description, an upward/downward direction Z, with the upper side thereof being the positive side and the lower side thereof being the negative side, is drawn as appropriate in the form of an axis Z in the drawings. The direction parallel to an optical axis AX of a projection lens of the projection optical apparatus 6 that is the projection lens closest to the light exiting side, that is, the direction parallel to the direction in which the projection optical apparatus 6 projects light is called an "optical axis direction X" and drawn as appropriate in the form of an axis X in the drawings. The optical axis direction X is perpendicular to the upward/downward direction Z. The direction perpendicular both to the optical axis direction X and the upward/downward direction Z is called a "width direction Y" and drawn as appropriate in the form of an axis Y in the drawings.

The upward/downward direction Z and the upper and lower sides thereof are merely names for describing the relative positional relationship among the portions of the projector, and the actual arrangement and other factors of the portions may differ from the arrangement and other factors indicated by the names.

Figure 7:
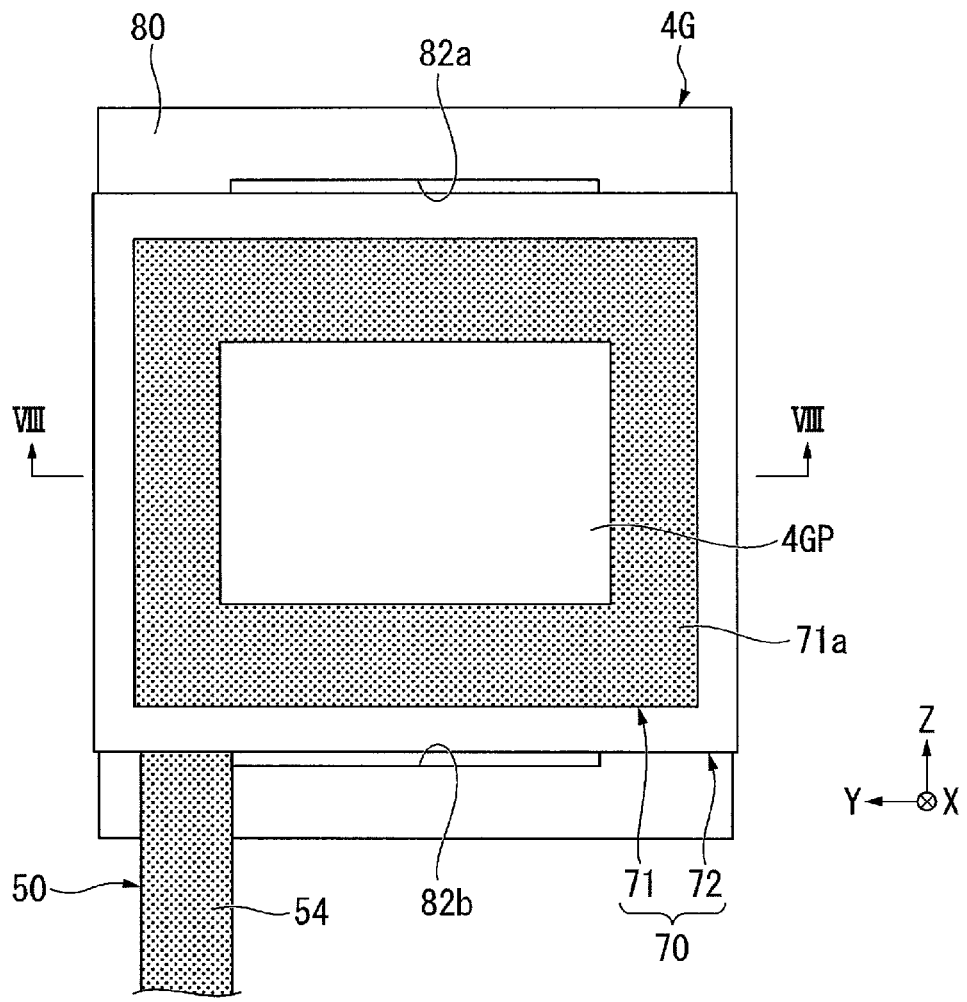
FIG. 7 shows one of the light modulation units in the first embodiment viewed from the light incident side.
Figure 8:
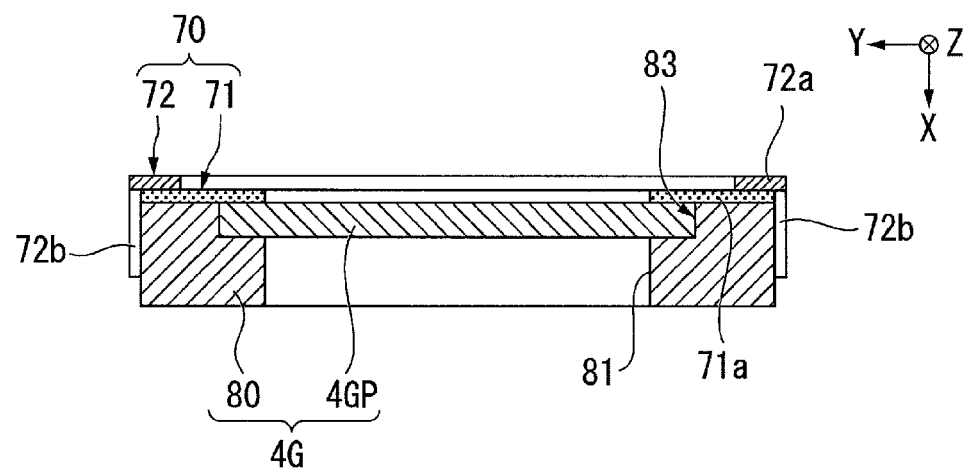
FIG. 8 is a cross-sectional view of the one light modulation unit in the first embodiment taken along the line VIII-VIII in FIG. 7.

FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which are each the cooling target, are so disposed as to surround the light combining system 5, as shown in FIG. 6. The light modulation units 4R and 4B are so disposed on the opposite sides of the light combining system 5 as to sandwich the light combining system 5 in the width direction Y. The light modulation unit 4G is disposed on the light incident side of the light combining system 5 in the optical axis direction X (−X side). The light modulation units 4R, 4G, and 4B have the same structure except that they are disposed in different positions and take different attitudes, and only the light modulation unit 4G will therefore be representatively described below in some cases.

The light modulation unit 4G includes a holding frame 80, which holds the light modulator 4GP. The holding frame 80 has the shape of a substantially rectangular parallelepiped that is flat in the direction in which light is incident on the light modulator 4GP and elongated in the upward/downward direction Z, as shown in FIGS. 6 to 8. The direction in which light is incident on the light modulator 4GP is, for example, the optical axis direction X.

The holding frame 80 has a through hole 81, which passes through the holding frame 80 in the light incident direction, as shown in FIG. 8. A stepped section 83, where the width of the through hole 81 increases, is provided along an edge of the through hole 81 that is the edge on the light incident side (−X side). The light modulator 4GP is so held by the holding frame 80 as to be fit into the stepped section 83. Insertion grooves 82a and 82b are formed in portions of the light-incident-side surface of the holding frame 80 that are portions on the opposite sides of the holding frame 80 in the upward/downward direction Z, as shown in FIG. 7.

The projector 1 further includes a cooling facilitator 70 provided as part of the light modulation unit 4G, which is part of the cooling target, as shown in FIGS. 6 to 8. The cooling facilitator 70 includes a refrigerant holder 71 and a fixing member 72. The refrigerant holder 71 is attached to a surface of the holding frame 80, which holds the light modulation unit 4G, which is part of the cooling target. In the present embodiment, the refrigerant holder 71 is provided on a surface of the holding frame 80 that is the surface facing the light incident side of the light modulator 4GP (−X side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
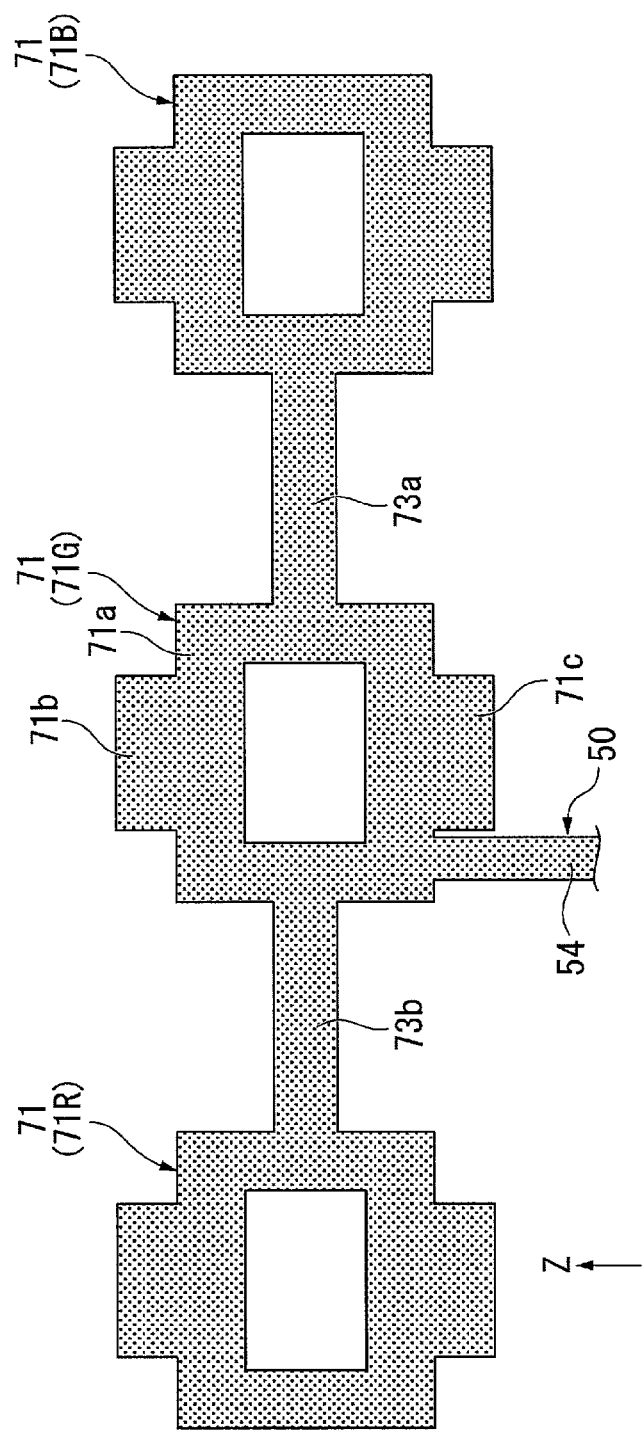
FIG. 9 shows refrigerant holders in the first embodiment.

FIG. 9 shows the refrigerant holder 71. The refrigerant holder 71 includes a main body section 71a, which has a rectangular-frame-like shape, and insertion sections 71b and 71c, which are provided at opposite ends of the main body section 71a that are the opposite ends in the upward/downward direction Z, as shown in FIG. 9. The main body section 71a covers part of a surface of the holding frame 80 that is the surface facing the light incident side of the light modulator 4GP (−X side), as shown in FIG. 8. An inner edge portion of the main body section 71a covers an outer edge portion of the light modulator 4GP. The insertion section 71b is bent and inserted into the insertion groove 82a of the holding frame 80. The insertion section 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of metal. The fixing member 72 includes a frame section 72a, which has a rectangular-frame-like shape, attachment sections 72b, and insertion sections 72c. The frame section 72a covers an outer edge portion of the refrigerant holder 71, as shown in FIGS. 7 and 8. The holding frame 80, the refrigerant holder 71, and the frame section 72a are layered on each other in the direction in which light passes through the light modulator unit 4G (optical axis direction X). In the following description, the direction in which the holding frame 80, the refrigerant holder 71, and the frame section 72a are layered on each other is simply called a "layering direction." The fixing member 72 fixes the refrigerant holder 71 in such a way that the frame section 72a and the holding frame 80 sandwich the refrigerant holder 71 in the layering direction (optical axis direction X).

The inner edge of the frame section 72a is so provided as to be shifted outward from the inner edge of the refrigerant holder 71. A portion of the refrigerant holder 71, that is, the portion inside the frame section 72a in the present embodiment is exposed when viewed in the layering direction from the side facing the fixing member 72.

The attachment sections 72b are provided at four end portions of the frame section 72a, opposite end portions in the upward/downward direction Z and opposite end portions in the width direction Y, as shown in FIGS. 6 and 8. The attachment sections 72b protrude from the frame section 72a toward the holding frame 80 (+X side). The attachment sections 72b engage with protrusions provided at the side surface of the holding frame 80. The fixing member 72 is thus fixed to the holding frame 80.

The insertion sections 72c are provided at the opposite ends of the frame section 72a in the upward/downward direction Z. The insertion sections 72c protrude from the frame section 72a toward the holding frame 80 (+X side). The insertion sections 72c are inserted into the insertion grooves 82a and 82b of the holding frame 80. The insertion sections 72c press the insertion sections 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is connected to the refrigerant sender 50, as shown in FIG. 9. In more detail, the connector 54 of the refrigerant sender 50 is connected to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that no connector 54 is connected to the refrigerant holder 71B or the refrigerant holder 71R.

In the present embodiment, linkage sections 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage sections 73a and 73b, respectively.

The linkage section 73a links the refrigerant holder 71G attached to the light modulation unit 4G to the refrigerant holder 71B attached to the light modulation unit 4B. The refrigerant holder 71B is thus connected to the connector 54 of the refrigerant sender 50 via the refrigerant holder 71G. The linkage section 73a is provided with a coating 74, which coats the linkage section 73a, as shown in FIG. 6. The coating 74 is, for example, a film made of resin.

The linkage section 73b links the refrigerant holder 71G attached to the light modulation unit 4G to the refrigerant holder 71R attached to the light modulation unit 4R. The refrigerant holder 71R is thus connected to the connector 54 of the refrigerant sender 50 via the refrigerant holder 71G. Although not shown, the linkage section 73b is similarly provided with a coating 74, as is the linkage section 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage section 73a and to the refrigerant holder 71R via the linkage section 73b. The refrigerant W generated by the refrigerant generator 20 is thus sent to the three light modulation units 4R, 4G, and 4B. The refrigerant W sent to and held by the refrigerant holders 71 then vaporizes to cool the light modulation units 4R, 4G, and 4B, which are each the cooling target. In more detail, the refrigerant W held by the refrigerant holders 71 vaporizes to cool the holding frames 80, to which the refrigerant holders 71 are attached, so that the light modulators 4RP, 4GP, and 4BP held by the holding frames 80 are cooled. The cooler 10 can thus cool the light modulators 4RP, 4GP, and 4BP, which are each the cooling target.

Figure 10:
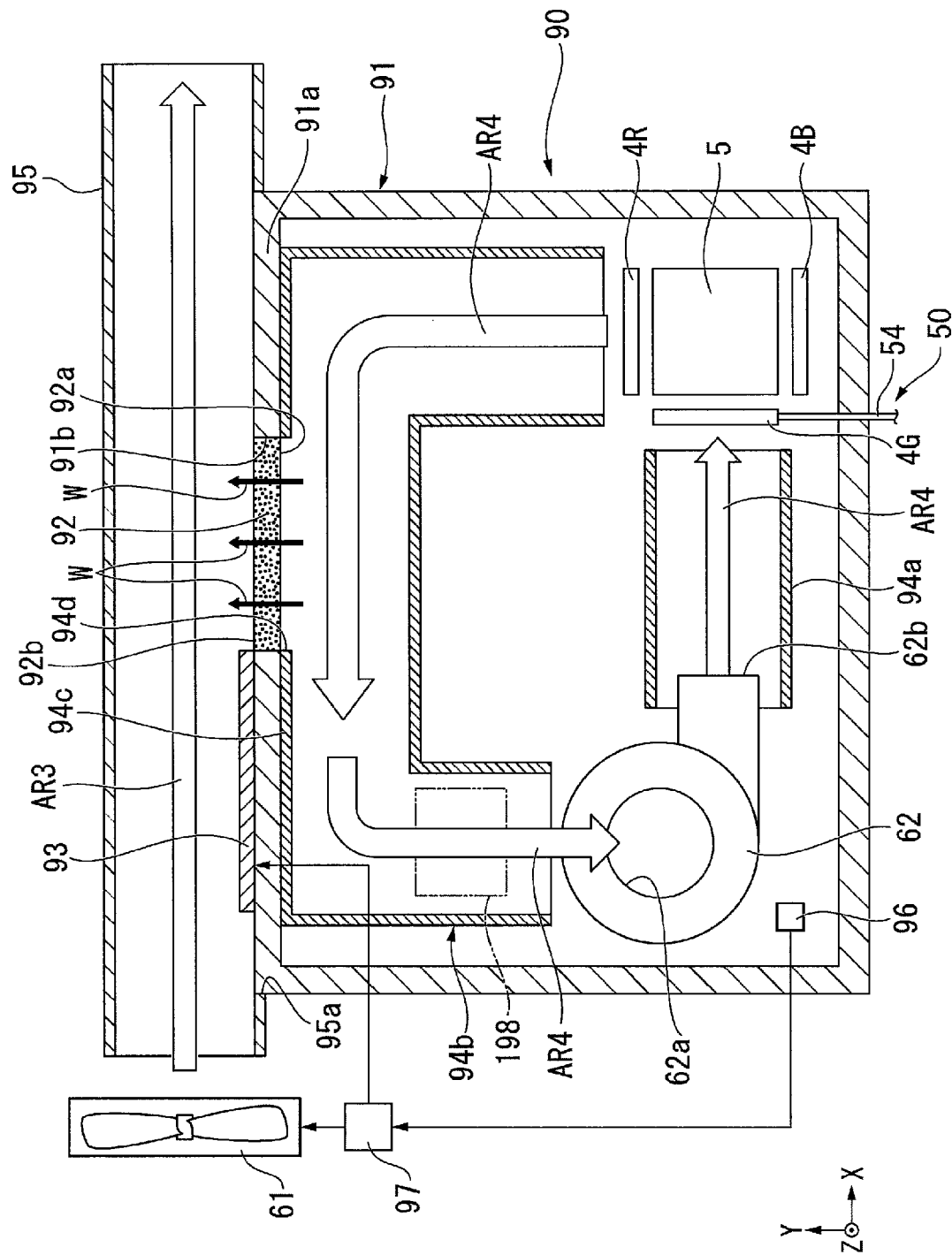
FIG. 10 diagrammatically shows a dustproof enclosure in the first embodiment.
Figure 11:
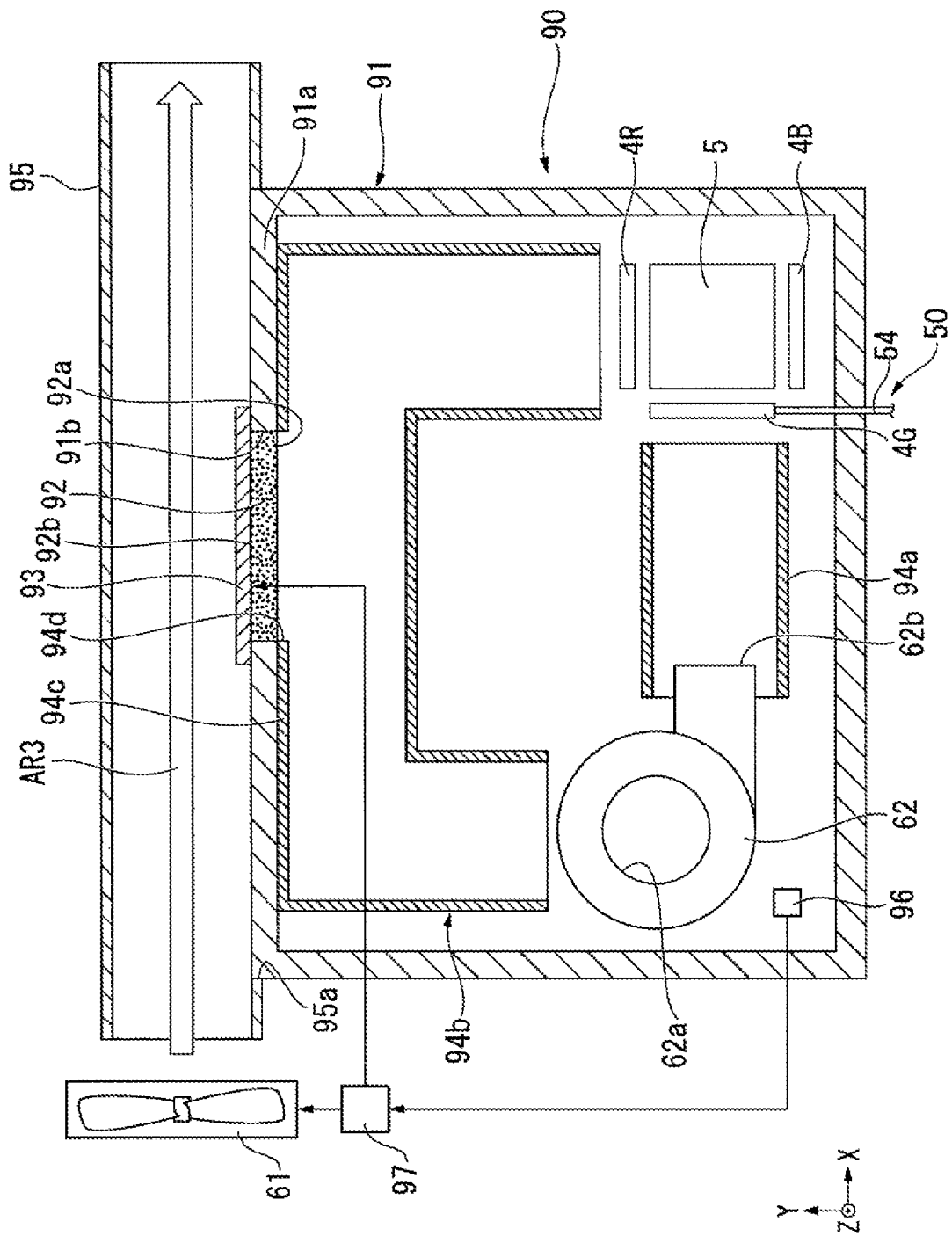
FIG. 11 diagrammatically shows the dustproof enclosure in the first embodiment.

In the present embodiment, the light modulation units 4R, 4G, and 4B, which are each the cooling target, are accommodated in a dustproof enclosure 90, which prevents dust, dirt, and other unwanted objects from adhering to the light modulation units 4R, 4G, and 4B, as shown in FIGS. 10 and 11. FIGS. 10 and 11 diagrammatically show the dustproof enclosure 90.

The projector 1 according to the present embodiment further includes the dustproof enclosure 90, a cooling blower 62, a third circulation duct 94a, a fourth circulation duct 94b, a shutter 93, an outer blower 61, a moisture absorbing duct 95, a humidity sensor 96, and a controller 97, as shown in FIGS. 10 and 11.

The dustproof enclosure 90 accommodates the light modulation units 4R, 4G, and 4B, which are each the cooling target. In the present embodiment, the dustproof enclosure 90 accommodates the light modulation units 4R, 4G, and 4B and the light combining system 5. The dustproof enclosure 90 is dust resistant. The dustproof enclosure 90 has, for example, the shape of a rectangular parallelepiped box. The dustproof enclosure 90 is sealed and can block passage of dust, dirt, and other unwanted objects into the interior of the dustproof enclosure 90 from the exterior thereof and vice versa. The dustproof enclosure 90 includes an enclosure main body 91 and a refrigerant transmissive section 92.

In the present specification, the state in which "a target is dust resistant" includes a state in which the target has a property that does not allow passage of dust, dirt, and other unwanted objects or a state in which the target has a property that does not substantially allow passage of dust, dirt, and other unwanted objects. The character of property that does not substantially allow passage of dust, dirt, and other unwanted objects includes a property that allows blockage of at least 90% of dust, dirt, and other unwanted objects that are incident on the target.

The enclosure main body 91 has, for example, the shape of a rectangular parallelepiped box. The enclosure main body 91 forms the majority of wall parts of the dustproof enclosure 90. A wall part 91a of the enclosure main body 91, which is the wall part located on one side in the width direction Y (+Y side) has a through hole 91b formed therein. The through hole 91b passes through the wall part 91a in the width direction Y. The enclosure main body 91 is dust resistant. In the present embodiment, the enclosure main body 91 is light transmissive and can transmit the light to be incident on the light modulation units 4R, 4G, and 4B and the light having exited out of the light combining system 5. The enclosure main body 91 blocks the refrigerant W. The enclosure main body 91 is made, for example, of glass or plastic. The enclosure main body 91A may instead have a structure in which a through hole is formed in a wall part of the through hole 91b that is the wall part facing the light exiting surface of the light combining system 5 and a light transmissive member that can transmit light is fit into the through hole so that the dust resistance of the enclosure main body 91 is maintained.

The refrigerant transmissive section 92 is fit into the through hole 91b and closes the through hole 91b. The refrigerant transmissive section 92 forms part of the wall parts of the dustproof enclosure 90. In other words, part of the wall parts that form the dustproof enclosure 90 is the refrigerant transmissive section 92. The refrigerant transmissive section 92 has an inner surface 92a, which faces the interior of the dustproof enclosure 90, and an outer surface 92b, which faces the exterior of the dustproof enclosure 90. The refrigerant transmissive section 92 allows the transmission of the refrigerant W into the interior of the dustproof enclosure 90 from the exterior thereof and vice versa with the dust resistance of the dustproof enclosure 90 maintained. In the present embodiment, the refrigerant transmissive section 92 is formed of a porous member. The material of the porous member that forms the refrigerant transmissive section 92 is, for example, polyester, diatomaceous earth, ceramic, or porous metal.

In the present specification, the state in which "the refrigerant transmissive section allows the transmission of the refrigerant into the interior of the dustproof enclosure from the exterior thereof and vice versa" includes a state in which the refrigerant present in the interior of the dustproof enclosure is movable to the exterior of the dustproof enclosure via the refrigerant transmissive section and a state in which the refrigerant present in the exterior of the dustproof enclosure is movable to the interior of the dustproof enclosure via the refrigerant transmissive section. The state of the refrigerant when moving from the interior of the dustproof enclosure to the exterior thereof via the refrigerant transmissive section and vice versa is not limited to a specific state. The refrigerant may be in the form of liquid, may be in the form of gas having vaporized, or may change between liquid and gas. In the present embodiment, the refrigerant transmissive section 92 absorbs the refrigerant W in the form of gas having vaporized in the dustproof enclosure 90 and discharges the absorbed refrigerant W in the form of gas out of the dustproof enclosure 90. The refrigerant W absorbed by the refrigerant transmissive section 92 condenses and returns to liquid again.

The cooling blower 62 is disposed in the dustproof enclosure 90. The cooling blower 62 delivers air to the light modulation units 4R, 4G, and 4B, which are each the cooling target. The cooling blower 62 circulates the air in the dustproof enclosure 90. The cooling blower 62 is, for example, a centrifugal fan. The cooling blower 62 may instead be an axial fan. The cooling blower 62 includes an intake port 62a, via which air is sucked, and an exhaust port 62b, via which the air is exhausted. In the following description, the air circulating in the dustproof enclosure 90 is called air AR4.

The third circulation duct 94a extends from the cooling blower 62 toward the light modulation units 4R, 4G, and 4B, which are each the cooling target, in the optical axis direction X. The air AR4 exhausted via the exhaust port 62b of the cooling blower 62 and delivered to the light modulation units 4R, 4G, and 4B passes through the third circulation duct 94a.

The fourth circulation duct 94b extends from a region on one side of the light modulation units 4R, 4G, and 4B in the width direction Y (+Y side) to a region on one side of the cooling blower 62 in the width direction Y. The air AR4 having been delivered via the third circulation duct 94a to the light modulation units 4R, 4G, and 4B and having passed by the light modulation units 4R, 4G, and 4B flows into the fourth circulation duct 94b. The air AR4 delivered from the light modulation units 4R, 4G, and 4B to the intake port 62a of the cooling blower 62 passes through the fourth circulation duct 94b.

As described above, the air AR4 exhausted via the exhaust port 62b of the cooling blower 62 is delivered to the light modulation units 4R, 4G, and 4B via the third circulation duct 94a, passes by the light modulation units 4R, 4G, and 4B, and is delivered to the intake port 62a of the cooling blower 62 via the fourth circulation duct 94b. The cooling blower 62 thus circulates the air AR4 in the dustproof enclosure 90.

The fourth circulation duct 94b includes an extending section 94c, which is in contact with the wall part 91a of the enclosure main body 91 and extends in the optical axis direction X. The extending section 94c has a through hole 94d. The through hole 94d faces the inner surface 92a of the refrigerant transmissive section 92. The inner surface 92a of the refrigerant transmissive section 92 is therefore exposed to the interior of the fourth circulation duct 94b via the through hole 94d. Part of the air AR4 passing through the fourth circulation duct 94b comes into contact with the inner surface 92a, which is exposed to the interior of the fourth circulation duct 94b via the through hole 94d, of the refrigerant transmissive section 92 when the air AR4 passes by the portion where the through hole 94d is provided. The cooling blower 62 thus circulates the air AR4 in the dustproof enclosure 90 and delivers the air AR4 to the inner surface 92a of the refrigerant transmissive section 92.

The shutter 93 is provided at the outer surface of the dustproof enclosure 90. In the present embodiment, the shutter 93 is provided at the outer surface of the wall part 91a. The shutter 93 is moved in the optical axis direction X, for example, by a driver that is not shown. The shutter 93 can switch a state in which the shutter 93 exposes the outer surface 92b of the refrigerant transmissive section 92 to a state in which the shutter 93 covers and closes the entire outer surface 92b of the refrigerant transmissive section 92 and vice versa. FIG. 10 shows the state in which the shutter 93 exposes the outer surface 92b of the refrigerant transmissive section 92. FIG. 11 shows the state in which the shutter 93 covers and closes the entire outer surface 92b of the refrigerant transmissive section 92. The shutter 93 is dust resistant. The shutter 93 blocks the refrigerant W.

The outer blower 61 is so disposed as to be external to the dustproof enclosure 90, as shown in FIG. 10. The outer blower 61 delivers air, for example, in the optical axis direction X. In the following description, the air delivered by the outer blower 61 is called air AR3. The air AR3 delivered by the outer blower 61 passes through a region on one side of the dustproof enclosure 90 in the width direction Y (+Y side). The outer blower 61 is not limited to a specific apparatus and may be any apparatus capable of delivering the air AR3, for example, an axial fan or a centrifugal fan.

The moisture absorbing duct 95 is a duct through which the air AR3 delivered by the outer blower 61 passes. The moisture absorbing duct 95 is so disposed as to be in contact with the one side of the dustproof enclosure 90 in the width direction Y (+Y side) and extends in the optical axis direction X. The moisture absorbing duct 95 has a through hole 95a. The through hole 95a faces an outer surface of the dustproof enclosure 90 that is the outer surface facing the one side in the width direction Y. The outer surface of the dustproof enclosure 90 that is the outer surface facing the one side in the width direction Y is therefore exposed to the interior of the moisture absorbing duct 95 via the through hole 95a.

The outer surface of the dustproof enclosure 90 that is the outer surface exposed to the interior of the moisture absorbing duct 95 includes the outer surface 92b of the refrigerant transmissive section 92 in the state in which the shutter 93 exposes the outer surface 92. Part of the air AR3 passing through the moisture absorbing duct 95 therefore comes into contact with the outer surface 92b of the refrigerant transmissive section 92 in the state in which the shutter 93 exposes the outer surface 92. The outer blower 61 thus delivers the air AR3 to the outer surface 92b of the refrigerant transmissive section 92. When the air AR3 is delivered to the outer surface 92b of the refrigerant transmissive section 92, the refrigerant W having vaporized in the dustproof enclosure 90 passes through the refrigerant transmissive section 92 and is discharged into the air AR3.

The humidity sensor 96 is disposed in the dustproof enclosure 90. The humidity sensor 96 is a sensor capable of measuring the humidity in the dustproof enclosure 90. The result of the measurement performed by the humidity sensor 96 is transmitted to the controller 97. The humidity sensor 96 is not limited to a specific sensor and can be any sensor capable of measuring the humidity in the dustproof enclosure 90.

The controller 97 controls the outer blower 61. In the present embodiment, the controller 97 controls the outer blower 61 based on the humidity in the dustproof enclosure 90 provided from the humidity sensor 96 to adjust the amount of air AR3 to be delivered to the outer surface 92b of the refrigerant transmissive section 92.

Specifically, the controller 97 increases the output of the outer blower 61 when the humidity in the dustproof enclosure 90 is relatively high to increase the amount of air AR3 to be delivered to the outer surface 92b of the refrigerant transmissive section 92. The increase in the amount of air AR3 to be delivered to the outer surface 92b of the refrigerant transmissive section 92 increases the amount of refrigerant W to be discharged into the air AR3 from the interior of the dustproof enclosure 90 via the refrigerant transmissive section 92. When the amount of refrigerant W discharged into the air AR3 per unit time is greater than the amount of refrigerant W that vaporizes in the dustproof enclosure 90, the humidity in the dustproof enclosure 90 lowers. The controller 97 can thus lower the humidity in the dustproof enclosure 90 by increasing the output of the outer blower 61 when the humidity in the dustproof enclosure 90 is relatively high.

On the other hand, the controller 97 decreases the output of the outer blower 61 when the humidity in the dustproof enclosure 90 is relatively low to decrease the amount of air AR3 to be delivered to the outer surface 92b of the refrigerant transmissive section 92. The decrease in the amount of air AR3 to be delivered to the outer surface 92b of the refrigerant transmissive section 92 decreases the amount of refrigerant W to be discharged into the air AR3 from the interior of the dustproof enclosure 90 via the refrigerant transmissive section 92. When the amount of refrigerant W discharged into the air AR3 per unit time is smaller than the amount of refrigerant W that vaporizes in the dustproof enclosure 90, the humidity in the dustproof enclosure 90 rises. The controller 97 can thus raise the humidity in the dustproof enclosure 90 by decreasing the output of the outer blower 61 when the humidity in the dustproof enclosure 90 is relatively low.

As described above, the controller 97 can adjust the humidity in the dustproof enclosure 90 by controlling the outer blower 61 based on the humidity in the dustproof enclosure 90 provided from the humidity sensor 96.

In the present embodiment, the controller 97 controls the shutter 93. When the projector 1 is in operation, the controller 97 achieves the state of the shutter 93 shown in FIG. 10 to cause the shutter 93 to expose the outer surface 92b of the refrigerant transmissive section 92. On the other hand, when the projector 1 is not in operation, the controller 97 achieves the state of the shutter 93 shown in FIG. 11 to cause the shutter 93 to close the outer surface 92b of the refrigerant transmissive section 92.

The controller 97 may control the shutter 93 based on the humidity in the dustproof enclosure 90 provided from the humidity sensor 96. For example, to raise the humidity in the dustproof enclosure 90 when the projector 1 is in operation, the controller 97 achieves the state of the shutter 93 shown in FIG. 11 to cause the shutter 93 to close the outer surface 92b of the refrigerant transmissive section 92. The shutter 93 can therefore block the movement of the refrigerant W from the interior of the dustproof enclosure 90 to the exterior thereof via the refrigerant transmissive section 92. The humidity in the dustproof enclosure 90 therefore rises when the refrigerant W supplied to the light modulation units 4R, 4G, and 4B vaporizes in the state shown in FIG. 11. The controller 97 can thus raise the humidity in the dustproof enclosure 90 by controlling the shutter 93.

According to the present embodiment, the cooler 10 can cool the cooling target by causing the refrigerant sender 50 to send the refrigerant W generated by the refrigerant generator 20 to the cooling target and using vaporization of the refrigerant W, which is an endothermic reaction, to draw heat from the cooling target. The cooling based on the vaporization of the refrigerant W can actively draw heat from the cooling target and therefore has excellent cooling performance as compared with air cooling and liquid cooling, in which a cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore causes no increase in noise. The present embodiment therefore provides a projector 1 including a cooler 10 that excels in cooling performance, has a compact size, and excels in quietness.

According to the present embodiment, in which the refrigerant generator 20 can generate the refrigerant W, a user's convenience can be improved because the user does not need to replenish the refrigerant W. Further, since the refrigerant generator 20 can perform adjustment in such a way that it generates the refrigerant W by a necessary amount as required, there is no need for storage of the refrigerant W, for example, in a storage tank, whereby the weight of the projector 1 can be reduced.

Further, for example, to prevent dust, dirt, and other unwanted objects from adhering to the cooling target to be cooled by the cooler 10, the cooling target is accommodated in a dustproof enclosure in some cases. In such cases, the refrigerant W having been supplied to the cooling target and therefore having vaporized raises the humidity in the dustproof enclosure. The rise in the humidity could cause problems, such as insufficient cooling of the cooling target because the refrigerant W is unlikely to vaporize, and erosion of a metal part and other components used to form the cooling target that is likely to occur due to the refrigerant W. Further, when the light modulation units 4R, 4G, and 4B are each the cooling target, as in the present embodiment, the refrigerant W having vaporized causes a cloudy dustproof enclosure, which could affect the light incident on and outputted from each of the light modulation units 4R, 4G, and 4B.

In contrast, according to the present embodiment, part of the wall parts that form the dustproof enclosure 90 is the refrigerant transmissive section 92, which allows transmission of the refrigerant W into the interior of the dustproof enclosure 90 from the exterior thereof and vice versa with the dust resistance of the dustproof enclosure 90 maintained. The refrigerant W having vaporized in the dustproof enclosure 90 can therefore be exhausted out of the dustproof enclosure 90 via the refrigerant transmissive section 92 with entry of dust, dirt, and other unwanted objects into the dustproof enclosure 90 suppressed. A rise in the humidity in the dustproof enclosure 90 can therefore be suppressed, whereby occurrence of the problems described above can be suppressed.

According to the present embodiment, the refrigerant transmissive section 92 is formed of a porous member. The refrigerant transmissive section 92 can therefore absorbe the refrigerant W having vaporized via the inner surface 92a of the refrigerant transmissive section 92 and discharge the absorbed refrigerant W out of the dustproof enclosure 90 via the outer surface 92b of the refrigerant transmissive section 92. Further, entry of smoke as well as dust, dirt, and other unwanted objects into the dustproof enclosure 90 can be preferably suppressed.

According to the present embodiment, the moisture absorbing/discharging member 40 can absorb water vapor contained in the air AR1 delivered from the first blower 60, and the moisture absorbed by the moisture absorbing/discharging member 40 can be discharged in the form of water vapor into the air AR2 delivered by the second blower 23. The heat exchanger 30 then allows the moisture discharged in the form of water vapor into the air AR2 to condense into the refrigerant W. Therefore, according to the present embodiment, the refrigerant W can be generated from the atmosphere in the projector 1.

For example, in the refrigerant generator 20, when the humidity of the air AR2 delivered from the second blower 23 to the heat exchanger 30 is relatively low, cooling the heat exchanger 30 is unlikely to allow generation of the refrigerant W in some cases. For example, when air or any other substance outside the projector 1 mixes with the air AR2 delivered to the heat exchanger 30, the humidity of the air AR2 lowers in some cases. In such cases, the refrigerant generation efficiency of the refrigerant generator 20 decreases.

In contrast, according to the present embodiment, the refrigerant generator 20 has the circulation path 27, which passes through a portion of the moisture absorbing/discharging member 40 that is the portion located in the second region F2 and the heat exchanger 30. Substantially sealing the circulation path 27 can therefore suppress entry of air outside the projector 1 into the circulation path 27, whereby the humidity of the air AR2 delivered to the heat exchanger 30 can be readily maintained relatively high. Cooling the heat exchanger 30 therefore allows the refrigerant W to be preferably generated. As a result, a decrease in the refrigerant generation efficiency of the refrigerant generator 20 can be suppressed.

According to the present embodiment, the heater 22 includes the heating main body 22a, which heats the air AR2 before passing through a portion of the moisture absorbing/discharging member 40 that is the portion located in the second region F2, and the second blower 23. The heater 22, in which the second blower 23 delivers the air AR2 to the moisture absorbing/discharging member 40, can therefore heat a portion of the moisture absorbing/discharging member 40 that is the portion located in the second region F2. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the outer blower 61, which delivers the air AR3 to the outer surface 92b of the refrigerant transmissive section 92, is provided. The refrigerant W absorbed by the refrigerant transmissive section 92 is therefore readily discharged into the air AR3 delivered to the outer surface 92b of the refrigerant transmissive section 92. The refrigerant W having vaporized can thus be preferably exhausted out of the dustproof enclosure 90.

According to the present embodiment, the controller 97, which adjusts the amount of air AR3 to be delivered to the outer surface 92b of the refrigerant transmissive section 92 based on the humidity in the dustproof enclosure 90, is provided. The controller 97 can therefore adjust the humidity in the dustproof enclosure 90, as described above. The humidity in the dustproof enclosure 90 can therefore be preferably maintained. Therefore, for example, even when the projector 1 is installed in a high-humidity environment, an increase in the humidity in the dustproof enclosure 90 can be suppressed, whereby the projector 1 can be preferably used.

According to the present embodiment, the cooling blower 62, which delivers the air AR4 to the light modulation units 4R, 4G, and 4B, which are each the cooling target, is provided. The air AR4 therefore causes the refrigerant W delivered to the light modulation units 4R, 4G, and 4B to readily vaporize, whereby the light modulation units 4R, 4G, and 4B can be further cooled.

According to the present embodiment, the cooling blower 62 circulates the air AR4 in the dustproof enclosure 90 to deliver the air AR4 to the inner surface 92a of the refrigerant transmissive section 92. The refrigerant W having vaporized and then contained in the air AR4 is therefore readier discharged from the air AR4 to the inner surface 92a of the refrigerant transmissive section 92. The refrigerant W in the dustproof enclosure 90 can thus be readily exhausted out of the dustproof enclosure 90 via the refrigerant transmissive section 92. In the present embodiment, in which the refrigerant transmissive section 92 is formed of a porous member, the cooling blower 62 delivers the air AR4 to the inner surface 92a of the refrigerant transmissive section 92 to cause the refrigerant transmissive section 92 to readily absorb the refrigerant W having vaporized and then contained in the air AR4.

According to the present embodiment, the shutter 93, which switches the state in which the shutter 93 exposes the outer surface 92b of the refrigerant transmissive section 92 to the state in which the shutter 93 covers and closes the entire outer surface 92b of the refrigerant transmissive section 92 and vice versa, is provided. Therefore, when the projector 1 is not in operation, the shutter 93 can close the outer surface 92b of the refrigerant transmissive section 92 to suppress influence of the external environment on the humidity in the dustproof enclosure 90.

Specifically, when the projector 1 is installed in a high-humidity environment, and even when the projector 1 is not in operation and the outer blower 61 is therefore not driven, an increase in the humidity in the dustproof enclosure 90 can be suppressed. Further, when the projector 1 is in operation, the controller 97 can adjust the humidity in the dustproof enclosure 90 by controlling the shutter 93 based on the humidity in the dustproof enclosure 90 as described above.

According to the present embodiment, the heat exchanger 30 is cooled by the air AR1 having been discharged from the first blower 60 and having passed through the moisture absorbing/discharging member 40. No cooling section that cools the heat exchanger 30 therefore needs to be separately provided, whereby an increase in the number of parts of the projector 1 can be suppressed. Further, an increase in noise produced by the projector 1 can be suppressed as compared with a case where a blower is separately provided as the cooling section that cools the heat exchanger 30.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant sender 50 sends the refrigerant W based on capillarity. No pump or any other power source for sending the refrigerant W therefore needs to be separately provided. An increase in the number of parts of the projector 1 can therefore be suppressed, whereby the size and weight of the projector 1 are each readily reduced by a greater amount.

According to the present embodiment, the refrigerant sender 50 includes the connector 54, which is formed of a porous member and connects the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is connected to the connector 54. The second catcher 52 can therefore absorb the refrigerant W accumulated in the second lid 33 and send the absorbed refrigerant W to the connector 54 based on capillarity. The generated refrigerant W is therefore readily delivered with no waste to the cooling target.

According to the present embodiment, the refrigerant sender 50 includes the first catcher 51, which is provided in the first lid 32, and the third catcher 53, which connects the first catcher 51 to the second catcher 52. The first catcher 51 can therefore absorb the refrigerant W having accumulated in the first lid 32 and send the absorbed refrigerant W to the second catcher 52 via the third catcher 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target.

According to the present embodiment, the third catcher 53 passes through one of the pipes 31*a*. The third catcher 53 can therefore absorb the refrigerant W having accumulated in the pipe 31*a* and send the absorbed refrigerant W to the cooling target via the second catcher 52 and the connector 54. The generated refrigerant W is therefore readily delivered with no waste to the cooling target.

According to the present embodiment, the width of the connector 54 is greater, for example, than the width of the first catcher 51, the width of the second catcher 52, and the width of the third catcher 53. The width of the connector 54 is therefore readily increased to a relatively large value, whereby the amount of refrigerant W that can be sent by the connector 54 can be increased. The refrigerant sender 50 therefore readily delivers the refrigerant W to the cooling target, whereby the cooling target is readily further cooled.

On the other hand, the width of the first catcher 51, the width of the second catcher 52, and the width of the third catcher 53 are each readily set at a relatively small value. The amount of refrigerant W held by each of the first catcher 51, the second catcher 52, and the third catcher 53 can therefore be reduced. The amount of refrigerant W held by the first catcher 51, the second catcher 52, and the third catcher 53 and hence left in the heat exchanger 30 can therefore be reduced, whereby the generated refrigerant W is readily delivered with no waste to the cooling target.

According to the present embodiment, the refrigerant holders 71, which hold the refrigerant W, are provided in the light modulation units 4R, 4G, and 4B, which are each the cooling target. The refrigerant holders 71 therefore allow the refrigerant W sent to the light modulation units 4R, 4G, and 4B to be held in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which are each the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, when the refrigerant holders 71 are fixed to the holding frames 80 with an adhesive, the pores in the refrigerant holders 71, which are each formed of a porous member, are closed in some cases with the adhesive absorbed by the refrigerant holders 71. The refrigerant holders 71 are therefore unlikely to absorb or hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with use of no adhesive. The situation in which the refrigerant holders 71 are unlikely to hold the refrigerant W can therefore be suppressed. Further, in the present embodiment, the fixing members 72 are made of metal. The fixing members 72 therefore have relatively high heat conductivity and are hence likely to be cooled. The air AR1 from the first blower 60 and the vaporization of the refrigerant W therefore readily lower the temperature of the fixing members 72, whereby the cooling target, which is in contact with fixing members 72, is readily further cooled.

According to the present embodiment, the refrigerant holder 71G is provided on a surface of the holding frame 80 that is the surface facing the light incident side of the light modulator 4GP. The configuration described above can suppress influence of the water vapor that is the refrigerant W having vaporized from the refrigerant holder 71G on the light outputted from the light modulator 4GP to the light combining system 5 and can therefore suppress formation of noise in an image projected from the projector 1.

According to the present embodiment, the refrigerant holders 71 are provided in the plurality of light modulation units 4R, 4G, and 4B, and the linkage sections 73*a* and 73*b* are provided and link the plurality of refrigerant holders 71 to each other. Connecting the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage sections 73a and 73b are provided with the respective coatings 74, which coat the linkage sections 73a and 73b. A situation in which the refrigerant W that moves along the linkage sections 73a and 73b vaporizes via the linkage sections 73a and 73b can therefore be suppressed. Therefore, a situation in which the refrigerant W vaporizes without contributing to the cooling of the light modulation units 4R, 4G, and 4B, which are each the cooling target, can be suppressed, whereby waste of the generated refrigerant W can be suppressed.

In the present embodiment, the connector 54 may also be coated, as are the linkage sections 73a and 73b. The configuration described above can suppress vaporization of the refrigerant W being sent to the cooling target. Therefore, the refrigerant W can be efficiently sent to the cooling target, and waste of the generated refrigerant W can be further suppressed. The circumference of each of the connector 54 and the linkage sections 73a and 73b may instead be covered, for example, with a tube. A coating treatment that suppresses the vaporization may still instead be performed on the surface of each of the connector 54 and the linkage sections 73a and 73b.

In the present embodiment, the following configurations are also employable. In the following description, configurations similar to those described above, for example, have the same reference characters as appropriate and will not be described in some cases.

The projector 1 may include a moisture absorbing member 198 accommodated in the dustproof enclosure 90, as indicated by the two-dot chain line in FIG. 10. The moisture absorbing member 198 can absorb the refrigerant W having vaporized in the dustproof enclosure 90. In FIG. 10, the moisture absorbing member 198 is disposed, for example, in the fourth circulation duct 94b. The moisture absorbing member 198 is made, for example, of silica gel or zeolite. According to the configuration described above, the moisture absorbing member 198 can lower the humidity in the dustproof enclosure 90, whereby an increase in the humidity in the dustproof enclosure 90 can be further suppressed.

Before the air AR3 delivered by the outer blower 61 to the outer surface 92b of the refrigerant transmissive section 92 is delivered to the outer surface 92b, the moisture in the air AR3 may be absorbed by a moisture absorbing member, such as the moisture absorbing member 198 described above. In this case, relatively dry air AR3 can be delivered to the outer surface 92b of the refrigerant transmissive section 92, the refrigerant W in the dustproof enclosure 90 can be preferably discharged into the air AR3. The refrigerant W having vaporized in the dustproof enclosure 90 can thus be preferably exhausted out of the dustproof enclosure 90.

The first blower 60 may deliver the air AR1 having passed through a portion of the moisture absorbing/discharging member 40 that is the portion located in the first region F1 to the outer surface 92b of the refrigerant transmissive section 92. The air AR1 having passed through the moisture absorbing/discharging member 40 is relatively dry because the moisture in the air AR1 is discharged into the moisture absorbing/discharging member 40. Delivering the air AR1 having passed through the moisture absorbing/discharging member 40 to the outer surface 92b of the refrigerant transmissive section 92 therefore allows the refrigerant W in the dustproof enclosure 90 to be preferably discharged into the air AR1 via the outer surface 92b of the refrigerant transmissive section 92. The refrigerant W having vaporized in the dustproof enclosure 90 can thus be preferably exhausted out of the dustproof enclosure 90.

In the configuration described above, the first blower 60 delivers the air AR1, for example, into the moisture absorbing duct 95. In the configuration described above, the air AR1 to be delivered by the first blower 60 to the outer surface 92b of the refrigerant transmissive section 92 may be the air AR1 before it flows into the cooling duct 21 or the air AR1 after it is discharged from the cooling duct 21. Further, in the configuration described above, no outer blower 61 may be provided. In the configuration described above, the first blower 60 may not deliver the air AR1 to the heat exchanger 30, and a blower that cools the heat exchanger 30 may be separately provided.

The first blower 60 may deliver the air AR1 having come into contact with the outer surface 92b of the refrigerant transmissive section 92 to a portion of the moisture absorbing/discharging member 40 that is the portion located in the first region F1. When the air AR1 comes into contact with the outer surface 92b of the refrigerant transmissive section 92, the refrigerant W in the dustproof enclosure 90 is discharged into the air AR1 via the refrigerant transmissive section 92. The air AR1 having come into contact with the outer surface 92b of the refrigerant transmissive section 92 therefore contains a relatively large amount of refrigerant W. Delivering the air AR1 having come into contact with the outer surface 92b of the refrigerant transmissive section 92 to the moisture absorbing/discharging member 40 therefore allows the refrigerant W to be preferably discharged into the moisture absorbing/discharging member 40. The refrigerant generation efficiency of the refrigerant generator 20 can therefore be improved. In the configuration described above, the first blower 60 delivers the air AR1, for example, into the moisture absorbing duct 95. Further, in the configuration described above, no outer blower 61 may be provided.

Figure 12:
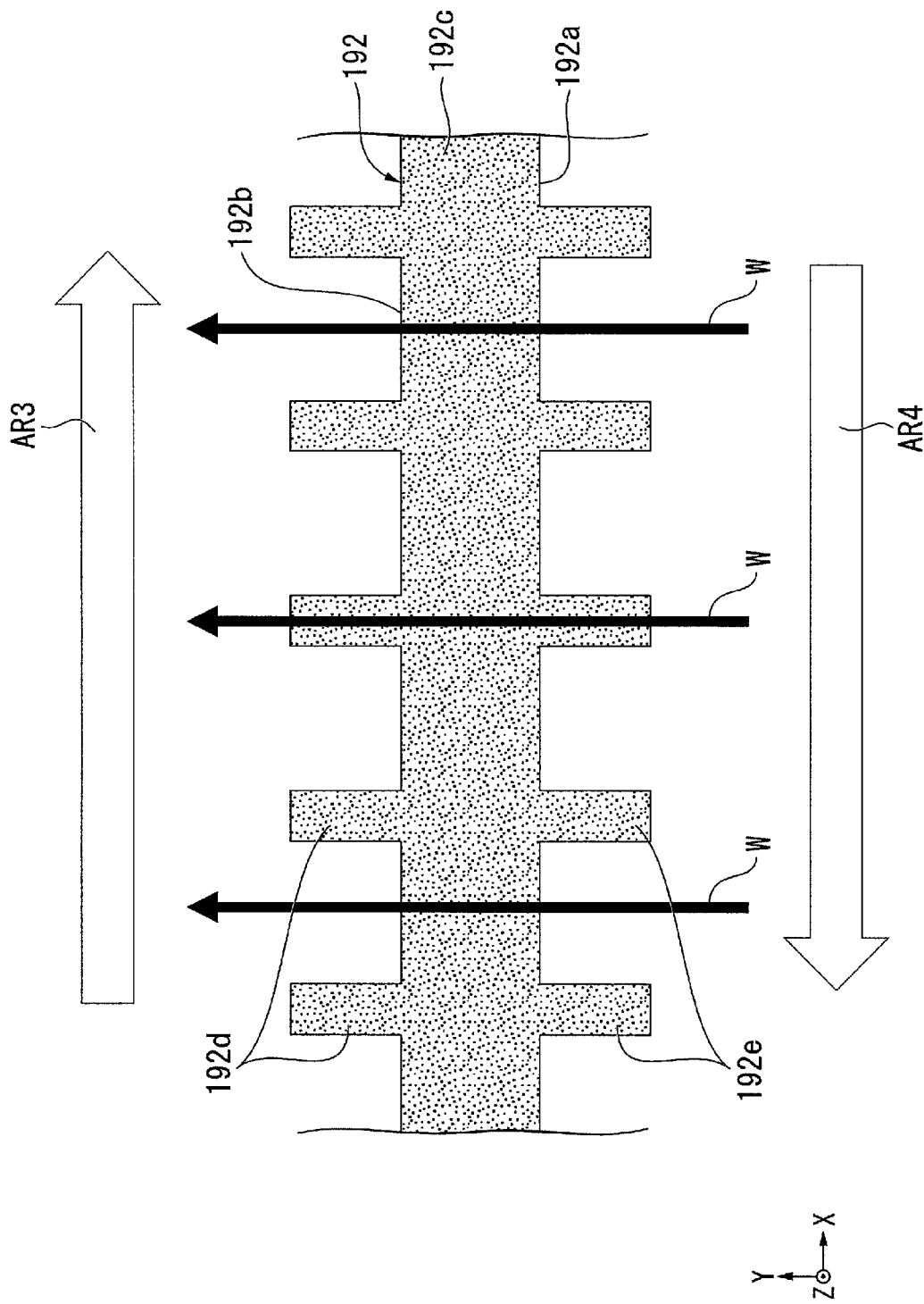
FIG. 12 shows part of a refrigerant transmissive section that is another example of the first embodiment.

The refrigerant transmissive section 92 may have the configuration of a refrigerant transmissive section 192 shown in FIG. 12. FIG. 12 shows part of the refrigerant transmissive section 192, which is another example of the present embodiment. The refrigerant transmissive section 192 includes a main body section 192c, a plurality of first protrusions 192d, and a plurality of second protrusions 192e, as shown in FIG. 12. The main body section 192c has the same shape as that of the refrigerant transmissive section 92 described above.

The first protrusions 192d are provided on the outer surface of the main body section 192c. The first protrusions 192d protrude toward the one side in the width direction Y (+Y side) in FIG. 12. The plurality of first protrusions 192d are arranged along the optical axis direction X.

The second protrusions 192e are provided on the inner surface of the main body section 192c. The second protrusions 192e protrude toward the other side in the width direction Y (−Y side) in FIG. 12. The second protrusions 192e are arranged along the optical axis direction X.

The other configurations of the refrigerant transmissive section 192 are the same as those of the refrigerant transmissive section 92 described above.

According to the configuration shown in FIG. 12, in which the first protrusions 192d are provided on the outer surface of the main body section 192c, the surface area of an outer surface 192b of the refrigerant transmissive section 192 can be increased. The refrigerant W can thus be readily discharged into the air AR3 via the outer surface 192b of the refrigerant transmissive section 192. The refrigerant W in the dustproof enclosure 90 can therefore be more readily exhausted out of the dustproof enclosure 90 via the refrigerant transmissive section 192, whereby an increase in the humidity in the dustproof enclosure 90 can be further suppressed.

According to the configuration shown in FIG. 12, in which the second protrusions 192e are provided on the inner surface of the main body section 192c, the surface area of an inner surface 192a of the refrigerant transmissive section 192 can be increased. The refrigerant W in the dustproof enclosure 90 is thus readily discharged via the inner surface 192a of the refrigerant transmissive section 192. The refrigerant W in the dustproof enclosure 90 can therefore be more readily exhausted out of the dustproof enclosure 90 via the refrigerant transmissive section 192, whereby an increase in the humidity in the dustproof enclosure 90 can be further suppressed.

Second Embodiment

Figure 13:
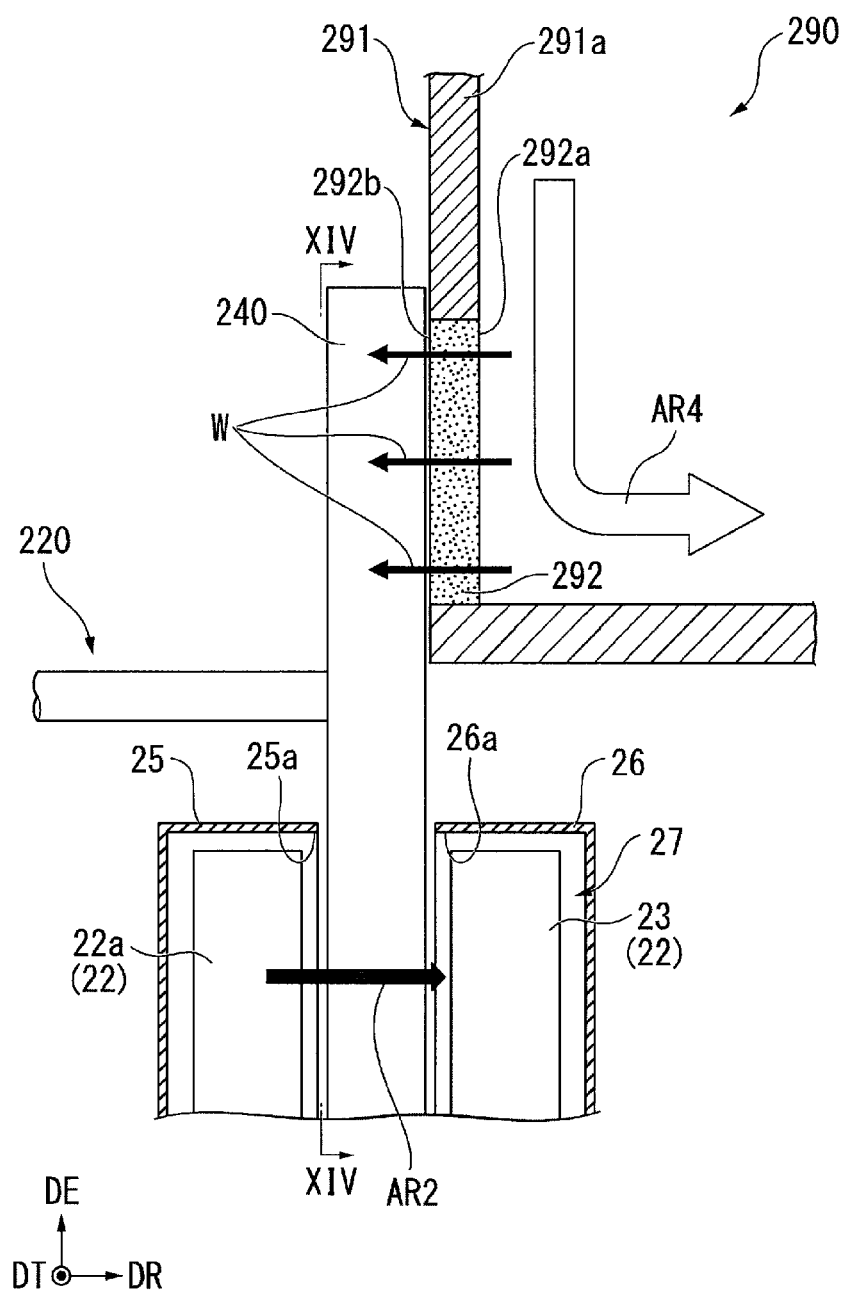
FIG. 13 shows a portion of a dustproof enclosure in a second embodiment.
Figure 14:
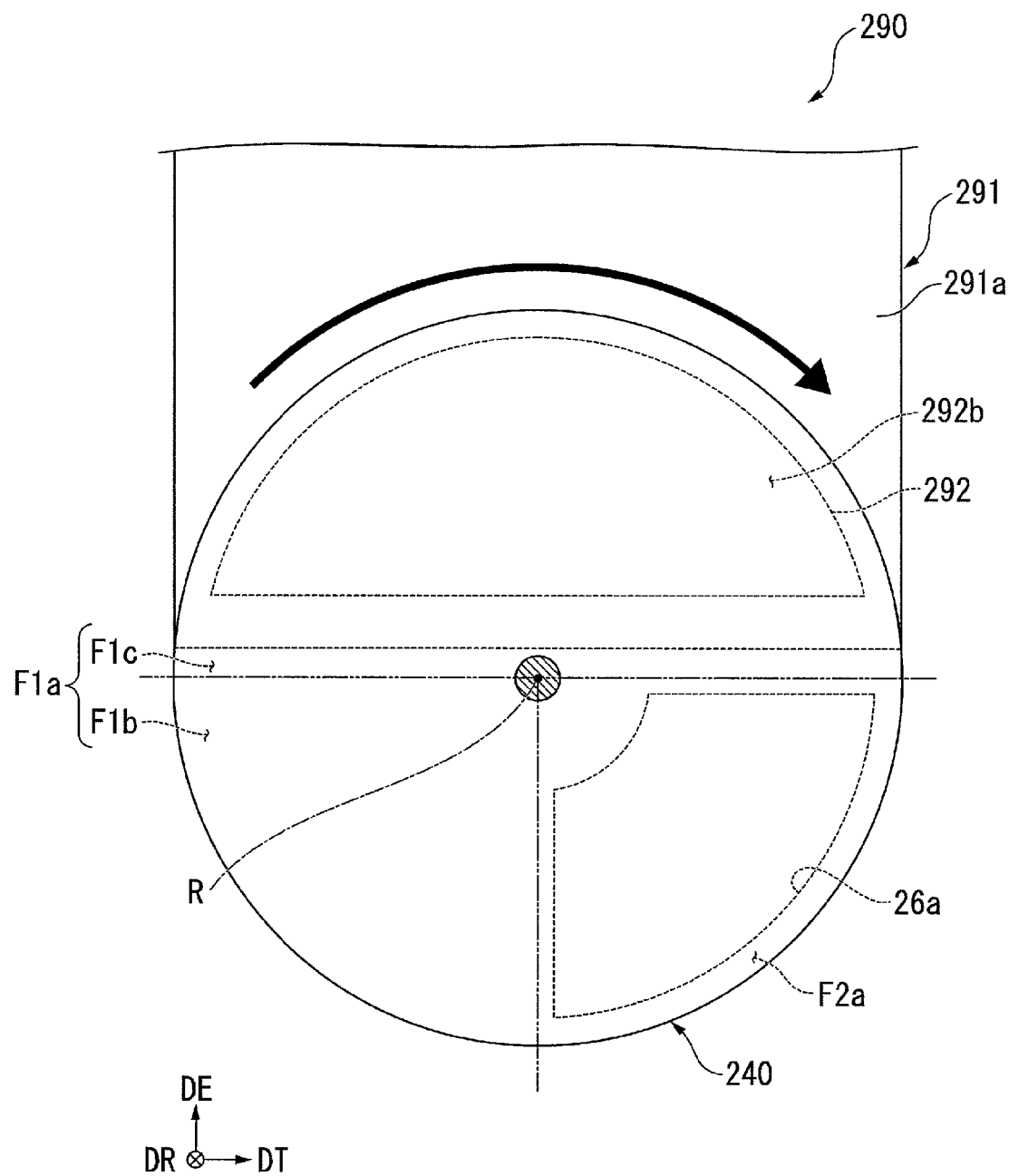
FIG. 14 shows the portion of the dustproof enclosure in the second embodiment and is a cross-sectional view taken along the line XIV-XIV in FIG. 13.

The present embodiment differs from the first embodiment in that the moisture is discharged from a refrigerant transmissive section 292 to a moisture absorbing/discharging member 240. Configurations similar to those in the embodiment described above, for example, have the same reference characters as appropriate and will not be described in some cases. FIG. 13 shows a portion of a dustproof enclosure 290 in the present embodiment. FIG. 14 shows the portion of the dustproof enclosure 290 in the present embodiment and is a cross-sectional view taken along the line XIV-XIV in FIG. 13.

The dustproof enclosure 290 in the present embodiment includes an enclosure main body 291 and a refrigerant transmissive section 292, as shown in FIG. 13. In the present embodiment, the refrigerant transmissive section 292 is provided at a wall part 291a of the enclosure main body 291 that is the wall part on the other side in the rotational axis direction DR (−DR side). The refrigerant transmissive section 292 is fit into a through hole formed in an end portion of the wall part 291a that is an end portion on the other side in the extension direction DE (−DE side). The refrigerant transmissive section 292 has a substantially semicircular shape when viewed along the rotational axis direction DR. The other configurations of the refrigerant transmissive section 292 are the same as those of the refrigerant transmissive section 92 in the first embodiment. The other configurations of the dustproof enclosure 290 are the same as those of the dustproof enclosure 90 in the first embodiment.

In a refrigerant generator 220 in the present embodiment, a portion of the moisture absorbing/discharging member 240 that is the portion located in a first region F1a faces the refrigerant transmissive section 292 with a distance therebetween in the region outside the dustproof enclosure 290, as shown in FIGS. 13 and 14. In other words, a gap is provided between the moisture absorbing/discharging member 240 and the refrigerant transmissive section 292, and the moisture absorbing/discharging member 240 faces the refrigerant transmissive section 292 via the gap. In the present embodiment, the first region F1a is shifted from the axis of rotation R toward the other side in the extension direction DE (−DE side) and has a region F1b, which is shifted from the axis of rotation R toward the other side in the thickness direction DT (−DT side), and a region F1c, which is shifted from the axis of rotation R toward the one side in the extension direction DE (+DE side), as shown in FIG. 14. The region F1b is a region shifted downward and leftward from the axis of rotation R in FIG. 14. The region F1c is a region shifted upward from the axis of rotation R in FIG. 14.

In the present embodiment, a portion of the moisture absorbing/discharging member 240 that is the portion located in the region F1c out of the first region F1a faces an outer surface 292b of the refrigerant transmissive section 292 in the rotational axis direction DR. Substantially the entirety of a portion of the moisture absorbing/discharging member 240 that is the portion located in the region F1c faces the outer surface of the dustproof enclosure 290. The moisture absorbing/discharging member 240 overlaps with the entire refrigerant transmissive section 292 when viewed along the rotational axis direction DR, as shown in FIG. 14. The air AR1 from the first blower 60 passes through a portion of the moisture absorbing/discharging member 240 that is the portion located in the region F1b out of the first region F1a.

The air AR2 circulating through the circulation path 27 passes through a portion of the moisture absorbing/discharging member 240 that is the portion located in a second region F2a. In the present embodiment, the second region F2a is shifted from the axis of rotation R toward the other side in the extension direction DE (−DE side) and shifted from the axis of rotation R toward one side in the thickness direction DT (+DT side). The second region F2a is a region shifted downward and rightward from the axis of rotation R in FIG. 14. The region F1b of the first region F1a and the second region F2a are each a region shifted downward from the region F1c of the first region F1a in FIG. 14.

In the present embodiment, the moisture absorbing/discharging member 240 rotates clockwise around the axis of rotation R when viewed from the other side in the rotational axis direction DR (−DR side). The region F1c is so provided as to be continuous with the region F1b on the forward side in the direction in which the moisture absorbing/discharging member 240 rotates. That is, each portion of the rotating moisture absorbing/discharging member 240 in the first region F1a moves from the region F1b to the region F1c. Each portion of the rotating moisture absorbing/discharging member 240 therefore moves to a position where the portion faces the refrigerant transmissive section 292 after the air AR1 delivered from the first blower 60 passes through the portion.

The other configurations of the moisture absorbing/discharging member 240 are the same as those of the moisture absorbing/discharging member 40 in the first embodiment. The other configurations of the refrigerant generator 220 are the same as those of the refrigerant generator 20 in the first embodiment.

According to the present embodiment, a portion of the moisture absorbing/discharging member 240 that is the portion located in the first region F1a faces the refrigerant transmissive section 292 with a distance therebetween in the region outside the dustproof enclosure 290. The refrigerant W having vaporized in the dustproof enclosure 290 and having been absorbed by the refrigerant transmissive section 292 via the inner surface 292a can therefore be discharged into the moisture absorbing/discharging member 240 via the outer surface 292b of the refrigerant transmissive section 292. As a result, the refrigerant W can be preferably discharged into the moisture absorbing/discharging member 240 with the refrigerant W in the dustproof enclosure 290 exhausted out of the dustproof enclosure 290. The refrigerant generation efficiency of the refrigerant generator 220 can therefore be improved with an increase in the humidity in the dustproof enclosure 290 suppressed. Further, since the moisture absorbing/discharging member 240 is so disposed as to be separate from the refrigerant transmissive section 292 with a distance therebetween, the moisture absorbing/discharging member 240 does not rub the refrigerant transmissive section 292 when the moisture absorbing/discharging member 240 rotates. The moisture absorbing/discharging member 240 is therefore readily rotated.

According to the present embodiment, the air AR1 is delivered from the first blower 60 to a portion of the moisture absorbing/discharging member 240 that is the portion located in the first region F1a, as in the first embodiment. The refrigerant W (water vapor) is therefore discharged into the moisture absorbing/discharging member 240 from both the air AR1 and the refrigerant transmissive section 292. The refrigerant generation efficiency of the refrigerant generator 220 can thus be further improved.

According to the present embodiment, each portion of the rotating moisture absorbing/discharging member 240 is located in a position where the portion faces the refrigerant transmissive section 292 after the air AR1 delivered from the first blower 60 passes through the portion. For example, when the amount of air AR1 delivered from the first blower 60 is relatively large and a relatively large amount of refrigerant W (water vapor) is discharged from the air AR1 into the portion of the moisture absorbing/discharging member 240, the amount of refrigerant W that the portion of the moisture absorbing/discharging member 240 can absorb is relatively small. Even the portion of the moisture absorbing/discharging member 240 disposed in a position where the portion faces the refrigerant transmissive section 292 therefore absorbs a relatively small amount of refrigerant W via the outer surface 292b of the refrigerant transmissive section 292. On the other hand, when the amount of air AR1 delivered from the first blower 60 is relatively small and a relatively small amount of refrigerant W (water vapor) is discharged from the air AR1 into the portion of the moisture absorbing/discharging member 240, the amount of refrigerant W that the portion of the moisture absorbing/discharging member 240 can absorb is relatively large. The portion of the moisture absorbing/discharging member 240 disposed in a position where the portion faces the refrigerant transmissive section 292 therefore absorbs a relatively large amount of refrigerant W via the outer surface 292b of the refrigerant transmissive section 292.

Locating each portion of the moisture absorbing/discharging member 240 in a position where the portion faces the refrigerant transmissive section 292 after the air AR1 delivered from the first blower 60 passes through the portion therefore allows adjustment of the amount of air AR1 for adjustment of the amount of refrigerant W to be discharged from the refrigerant transmissive section 292 to the portion of the moisture absorbing/discharging member 240. Adjustment of the amount of air AR1 delivered from the first blower 60 therefore allows adjustment of the amount of refrigerant W to be exhausted form the interior of the dustproof enclosure 290, whereby the humidity in the dustproof enclosure 290 can be adjusted.

In the present embodiment, the following configurations are also employable.

In the present embodiment, no first blower 60 may be provided. Even in this case, the moisture absorbing/discharging member 240 can exhaust the refrigerant W in the dustproof enclosure 290 out thereof via the refrigerant transmissive section 292. Further, also in the present embodiment, an outer blower that delivers air to the outer surface 292b of the refrigerant transmissive section 292 may be provided, as in the first embodiment.

The distance between the moisture absorbing/discharging member 240 and the refrigerant transmissive section 292 is not limited to a specific value and can be any value that allows the refrigerant W absorbed by the refrigerant transmissive section 292 to be discharged into the moisture absorbing/discharging member 240. The distance between the moisture absorbing/discharging member 240 and the refrigerant transmissive section 292 is, for example, smaller than the dimension of the moisture absorbing/discharging member 240 in the rotational axis direction DR and the dimension of the refrigerant transmissive section 292 in the rotational axis direction DR. The distance between the moisture absorbing/discharging member 240 and the refrigerant transmissive section 292 is preferably as small as possible.

The moisture absorbing/discharging member 240 and the refrigerant transmissive section 292 may be in contact with each other. Further, for example, the dustproof enclosure may be provided with a recess, and part of the moisture absorbing/discharging member 240 may be accommodated in the recess. In this case, at least part of the inner surface of the recess may be formed of the outer surface of the refrigerant transmissive section, and the moisture absorbing/discharging member 240 may face the refrigerant transmissive section with a distance therebetween with part of the moisture absorbing/discharging member 240 accommodated in the recess or may be in contact with the refrigerant transmissive section with part of the moisture absorbing/discharging member 240 accommodated in the recess.

Embodiments of the present disclosure are not limited to the embodiments described above, and the following configurations are also employable.

The configuration of the refrigerant transmissive section is not limited to the configuration in each of the embodiments described above. The refrigerant transmissive section does not necessarily have a specific configuration and can have any configuration that allows transmission of the refrigerant W into the interior of the dustproof enclosure from the exterior thereof and vice versa with the dust resistance of the dustproof enclosure maintained. The refrigerant transmissive section may, for example, be a filter or an osmosis film. A plurality of refrigerant transmissive sections may be provided. In this case, the dustproof enclosure may be provided, for example, with the refrigerant transmissive section 92 in the first embodiment and the refrigerant transmissive section 292 in the second embodiment. The refrigerant transmissive section may be formed of a plurality of porous member layers arranged with a space therebetween. The air in the dustproof enclosure may not circulate. That is, no cooling blower may be provided. No shutter may be provided.

The position of the refrigerant transmissive section in the dustproof enclosure is not limited to a specific position. In the first embodiment, the refrigerant transmissive section 292 is provided at the wall part 91a of the dustproof enclosure 90, which is the wall part located on the one side in the width direction Y (+Y side), but not necessarily. For example, the refrigerant transmissive section may be provided at a wall part of the dustproof enclosure that is the wall part on one side in the upward/downward direction Z (+Z side). In this case, the fourth circulation duct and the moisture absorbing/discharging member are also disposed in a portion of the dustproof enclosure that is the portion on the one side in the upward/downward direction Z (+Z side).

The heater does not necessarily have the configuration described above. The heater may include as the heating main body a heat sink heated by another heat source. In this case, the heat sink of the heater may be heated by exhaust gas from the light source apparatus. The heater may instead be in contact with the moisture absorbing/discharging member and heat the moisture absorbing/discharging member. In this case, the heater may not heat the air before passing through the moisture absorbing/discharging member.

The configuration of the refrigerant generator is not limited to the configuration in the embodiments described above. The refrigerant generator does not necessarily have a specific configuration and may have any configuration that allows generation of the refrigerant. For example, the refrigerant generator may include a fuel cell, such as a hydrogen cell. In this case, for example, water generated by the fuel cell that supplies the projector 1 with electric power to can be used as the refrigerant. The refrigerant is not limited to a specific medium and may be any non-water medium capable of cooling the cooling target. The refrigerant to be generated is not limited to a liquid and may, for example, be a solid. In this case, the solid refrigerant may change to a liquid while the refrigerant is sent to the cooling target or may be sent in the form of the solid to the cooling target. In the case where the refrigerant is sent in the form of the solid to the cooling target, the refrigerant may be sublimated directly into a gas to cool the cooling target or may be melted and changed to a liquid, which may then vaporize to cool the cooling target.

The heat exchanger does not necessarily have a specific configuration and may have any configuration that allows generation of the refrigerant from air having flowed into the heat exchanger by cooling the air. The heat exchanger may be cooled by an apparatus different from the first blower. A driver that rotates the moisture absorbing/discharging member is not limited to the motor or is not necessarily a specific component. The driver that rotates the moisture absorbing/discharging member may be a blower that blows air to the moisture absorbing/discharging member. In this case, for example, the moisture absorbing/discharging member is provided with vanes rotated by wind force and rotates when receiving wind force from the blower as the driver. The blower as the driver may, for example, be the first blower 60 in the embodiments described above.

The configuration of the refrigerant sender is not limited to the configuration in the embodiments described above. The refrigerant sender does not necessarily have a specific configuration and may have any configuration that can send the refrigerant to the cooling target. The refrigerant sender may include a pump that sends the refrigerant and a pipe through which the refrigerant sent by the pump passes. The refrigerant sender may instead send the refrigerant to the cooling target, for example, by using gravity.

The configuration of the cooling facilitators is not limited to the configuration in the embodiments described above. The cooling facilitators do not necessarily have a specific configuration and may have any configuration that can facilitate the cooling of the cooling target performed by the refrigerant sent to the cooling target. For example, the refrigerant holder of each of the cooling facilitators may be minute protruding portions and recessed portions formed in the surface of the cooling target, for example, by processing the surface. In this case, the protruding portions and the recessed portions hold the refrigerant. The refrigerant holders may instead, for example, each be a hydrophilic coating provided on the surface of the cooling target.

The cooling target in the embodiments described above is the light modulation units, but not necessarily. The cooling target may include at least one of the light modulators, the light modulation units, the light source apparatus, a wavelength converter that converts the wavelength of the light outputted from the light source apparatus, a diffuser that diffuses the light outputted from the light source apparatus, and a polarization converter that converts the polarization direction of the light outputted from the light source apparatus. According to the configuration described above, each portion of the projector can be cooled in the same manner described above.

In the embodiments described above, the description has been made with reference to the case where the present disclosure is applied to the transmission-type projector, and the present disclosure is also applicable to a reflection-type projector. The term "transmission-type" means that the light modulators each including a liquid crystal panel or any other component transmit light. The term "reflection-type" means that the light modulators reflect light. The light modulators are each not limited, for example, to a liquid crystal panel and may, for example, be a micromirror-based light modulator.

In the embodiments described above, the projector using the three light modulators has been presented by way of example. The present disclosure is also applicable to a projector using only one light modulator and a projector using four or more light modulators.

The configurations described above can be combined with one another to the extent that the combination causes no contradiction.

What is claimed is:

1. A projector including a cooling target, the projector comprising:
    a light source configured to emit light;
    a light modulator configured to modulate the light emitted from the light source in accordance with an image signal;
    a projection optical apparatus configured to project the light modulated by the light modulator;
    a cooler configured to cool the cooling target based on transformation of a refrigerant into a gas; and
    a dustproof enclosure accommodating the cooling target, wherein:
    the cooler includes
        a refrigerant generator configured to generate the refrigerant from atmosphere taken inside of the projector, and
        a refrigerant sender configured to send the generated refrigerant toward the cooling target, and
    part of a wall part that forms the dustproof enclosure is a refrigerant transmissive section that maintains dust resistance of the dustproof enclosure and allows the refrigerant to move both into an exterior of the dustproof enclosure from an interior of the dustproof enclosure and into the interior from the exterior.

2. The projector according to claim 1, wherein the refrigerant transmissive section is formed of a porous member.

3. The projector according to claim 1, wherein:
    the refrigerant generator includes
        a moisture absorbing/discharging member rotating,
        a first blower configured to deliver air to a portion of the moisture absorbing/discharging member that is a portion located in a first region,
        a heat exchanger connected to the refrigerant sender,
        a heater configured to heat a portion of the moisture absorbing/discharging member that is a portion located in a second region different from the first region, and a second blower configured to deliver, to the heat exchanger, air around a portion of the moisture absorbing/discharging member that is the portion heated by the heater, and the heat exchanger, when cooled, generates the refrigerant from the air flowing into the heat exchanger.

4. The projector according to claim 3, wherein the portion of the moisture absorbing/discharging member that is the portion located in the first region faces the refrigerant transmissive section with a distance between the portion and the refrigerant transmissive section in a region outside the dustproof enclosure.

5. The projector according to claim 3, wherein the first blower delivers, to an outer surface of the refrigerant transmissive section, air that passed through the portion of the moisture absorbing/discharging member that is the portion located in the first region.

6. The projector according to claim 3, wherein the first blower delivers air that came into contact with an outer surface of the refrigerant transmissive section to the portion of the moisture absorbing/discharging member that is the portion located in the first region.

7. The projector according to claim 1, further comprising an outer blower configured to deliver air to an outer surface of the refrigerant transmissive section.

8. The projector according to claim 5, further comprising a controller configured to adjust an amount of air delivered to the outer surface of the refrigerant transmissive section based on humidity in the dustproof enclosure.

9. The projector according to claim 1, wherein:
the refrigerant generator includes
a rotating moisture absorbing/discharging member having a portion that is located in a first region and faces the refrigerant transmissive section with a distance between the portion and the refrigerant transmissive section in a region outside the dustproof enclosure,
a heat exchanger connected to the refrigerant sender,
a heater configured to heat a portion of the moisture absorbing/discharging member that is a portion located in a second region different from the first region, and
a blower configured to deliver, to the heat exchanger, air around a portion of the moisture absorbing/discharging member that is the portion heated by the heater, and the heat exchanger, when cooled, generates the refrigerant from the air flowing into the heat exchanger.

10. The projector according to claim 1, further comprising a cooling blower disposed in the dustproof enclosure and configured to deliver air to the cooling target.

11. The projector according to claim 10, wherein the cooling blower circulates air in the dustproof enclosure to deliver the air to an inner surface of the refrigerant transmissive section.

12. The projector according to claim 1, further comprising a shutter configured to switch between a state in which the shutter exposes an outer surface of the refrigerant transmissive section and a state in which the shutter covers and closes the entire outer surface of the refrigerant transmissive section.

13. The projector according to claim 1, further comprising a moisture absorbing member accommodated in the dustproof enclosure.

14. The projector according to claim 1, wherein the cooling target is the light modulator.

* * * * *